US009442615B2

(12) United States Patent
Reynolds

(10) Patent No.: US 9,442,615 B2
(45) Date of Patent: Sep. 13, 2016

(54) FREQUENCY SHIFTING FOR SIMULTANEOUS ACTIVE MATRIX DISPLAY UPDATE AND IN-CELL CAPACITIVE TOUCH

(71) Applicant: Synaptics Incorporated, San Jose, CA (US)

(72) Inventor: Joseph Kurth Reynolds, Alviso, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 14/503,068

(22) Filed: Sep. 30, 2014

(65) Prior Publication Data

US 2015/0091864 A1    Apr. 2, 2015

Related U.S. Application Data

(60) Provisional application No. 61/886,025, filed on Oct. 2, 2013, provisional application No. 62/020,854, filed on Jul. 3, 2014.

(51) Int. Cl.
*G06F 3/044* (2006.01)
*G06F 3/041* (2006.01)

(52) U.S. Cl.
CPC ............. *G06F 3/044* (2013.01); *G06F 3/0412* (2013.01); *G06F 3/0418* (2013.01)

(58) Field of Classification Search
CPC ..... G06F 3/044; G06F 3/0412; G06F 3/0418
See application file for complete search history.

(56) References Cited

U.S. PATENT DOCUMENTS

| 5,093,655 A | 3/1992 | Tanioka et al. |
| 5,392,058 A | 2/1995 | Tagawa |
| 5,534,892 A | 7/1996 | Tagawa |
| 5,896,120 A | 4/1999 | Iguchi et al. |

(Continued)

FOREIGN PATENT DOCUMENTS

| CN | 101051256 A | 10/2007 |
| CN | 1940842 B | 5/2010 |

(Continued)

OTHER PUBLICATIONS

International Search Report and Written Opinion dated Dec. 26, 2013 for Application No. PCT/US2013/057990.

(Continued)

*Primary Examiner* — Premal Patel
(74) *Attorney, Agent, or Firm* — Patterson + Sheridan, LLP

(57) ABSTRACT

Embodiments generally provide a method, input device, and processing system for frequency shifting for synchronized display updating and capacitive sensing. The method includes driving a display signal onto at least one display electrode for updating a display. The method further includes driving a first capacitive sensing signal having a first frequency onto at least one sensor electrode, wherein the first frequency is synchronized to the display signal. The method further includes driving a second capacitive sensing signal having a second frequency onto the at least one sensor electrode, wherein the first and second frequencies differ and a timing of the display signal is adjusted to maintain synchronization with the second frequency, and wherein each capacitive sensing signal and the display signal are driven in parallel for at least some period of time.

22 Claims, 10 Drawing Sheets

(56) References Cited

U.S. PATENT DOCUMENTS

| | | |
|---|---|---|
| 6,219,113 B1 | 4/2001 | Takahara |
| 6,239,788 B1 | 5/2001 | Nohno et al. |
| 7,031,886 B1 | 4/2006 | Hargreaves |
| 7,451,050 B2 | 11/2008 | Hargreaves |
| 7,633,566 B2 | 12/2009 | Utsunomiya et al. |
| 8,243,027 B2 | 8/2012 | Hotelling et al. |
| 8,743,300 B2 | 6/2014 | Chang et al. |
| 2004/0095336 A1 | 5/2004 | Hong et al. |
| 2004/0217945 A1 | 11/2004 | Miyamoto et al. |
| 2006/0012575 A1 | 1/2006 | Knapp et al. |
| 2006/0114247 A1 | 6/2006 | Brown |
| 2007/0074914 A1 | 4/2007 | Geaghan et al. |
| 2007/0262966 A1 | 11/2007 | Nishimura et al. |
| 2008/0018581 A1 | 1/2008 | Park et al. |
| 2008/0018612 A1 | 1/2008 | Nakamura et al. |
| 2008/0048989 A1 | 2/2008 | Yoon et al. |
| 2008/0055267 A1 | 3/2008 | Wu et al. |
| 2008/0062139 A1 | 3/2008 | Hotelling et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0150901 A1 | 6/2008 | Lowles et al. |
| 2008/0180407 A1 | 7/2008 | Utsunomiya et al. |
| 2008/0309625 A1 | 12/2008 | Krah et al. |
| 2008/0309628 A1 | 12/2008 | Krah et al. |
| 2009/0009194 A1 | 1/2009 | Seguine |
| 2009/0160461 A1 | 6/2009 | Zangl et al. |
| 2009/0189867 A1 | 7/2009 | Krah et al. |
| 2009/0195511 A1 | 8/2009 | Cites et al. |
| 2009/0256818 A1 | 10/2009 | Noguchi et al. |
| 2010/0001973 A1 | 1/2010 | Hotelling et al. |
| 2010/0019780 A1 | 1/2010 | Bulea |
| 2010/0045635 A1 | 2/2010 | Soo |
| 2010/0060591 A1 | 3/2010 | Yousefpor et al. |
| 2010/0066692 A1 | 3/2010 | Noguchi et al. |
| 2010/0085324 A1 | 4/2010 | Noguchi et al. |
| 2010/0110040 A1 | 5/2010 | Kim et al. |
| 2010/0139865 A1 | 6/2010 | Tillement et al. |
| 2010/0182273 A1 | 7/2010 | Noguchi et al. |
| 2010/0193257 A1 | 8/2010 | Hotelling et al. |
| 2010/0194695 A1 | 8/2010 | Hotelling et al. |
| 2010/0194696 A1 | 8/2010 | Chang et al. |
| 2010/0194697 A1 | 8/2010 | Hotelling et al. |
| 2010/0194698 A1 | 8/2010 | Hotelling et al. |
| 2010/0214262 A1 | 8/2010 | Ishizaki et al. |
| 2010/0225612 A1 | 9/2010 | Ishizaki et al. |
| 2010/0265210 A1 | 10/2010 | Nakanishi et al. |
| 2010/0289765 A1 | 11/2010 | Noguchi et al. |
| 2010/0295804 A1 | 11/2010 | Takeuchi et al. |
| 2010/0295824 A1 | 11/2010 | Noguchi et al. |
| 2010/0302202 A1 | 12/2010 | Takeuchi et al. |
| 2010/0309162 A1 | 12/2010 | Nakanishi et al. |
| 2010/0321034 A1 | 12/2010 | Hargreaves |
| 2010/0328239 A1 | 12/2010 | Harada et al. |
| 2010/0328255 A1 | 12/2010 | Ishizaki et al. |
| 2010/0328256 A1 | 12/2010 | Harada et al. |
| 2010/0328257 A1 | 12/2010 | Noguchi et al. |
| 2010/0328259 A1 | 12/2010 | Ishizaki et al. |
| 2010/0328274 A1 | 12/2010 | Noguchi et al. |
| 2010/0328291 A1 | 12/2010 | Ishizaki et al. |
| 2011/0050585 A1 | 3/2011 | Hotelling et al. |
| 2011/0061947 A1 | 3/2011 | Krah et al. |
| 2011/0061948 A1 | 3/2011 | Krah et al. |
| 2011/0187677 A1 | 8/2011 | Hotelling et al. |
| 2011/0210939 A1 | 9/2011 | Reynolds et al. |
| 2011/0210940 A1* | 9/2011 | Reynolds ............. G06F 3/0418 345/174 |
| 2011/0210941 A1 | 9/2011 | Reynolds et al. |
| 2011/0248949 A1 | 10/2011 | Chang et al. |
| 2011/0267293 A1 | 11/2011 | Noguchi et al. |
| 2011/0267305 A1 | 11/2011 | Shahparnia et al. |
| 2011/0316792 A1 | 12/2011 | Huang et al. |
| 2012/0044167 A1 | 2/2012 | Nakanishi et al. |
| 2012/0044195 A1 | 2/2012 | Nakanishi et al. |
| 2012/0092285 A1 | 4/2012 | Osborn et al. |
| 2012/0162104 A1 | 6/2012 | Chang et al. |
| 2012/0249476 A1 | 10/2012 | Schwartz et al. |

FOREIGN PATENT DOCUMENTS

| | | | |
|---|---|---|---|
| EP | 1936479 A1 | 6/2008 | |
| EP | 1892605 A3 | 7/2008 | |
| JP | 2006106853 A | 4/2006 | |
| JP | 2007334606 A | 12/2007 | |
| JP | 2008090623 A | 4/2008 | |
| JP | 2010072581 A | 4/2010 | |
| KR | 1010850806 | 11/2011 | |
| KR | 20120045992 | 5/2012 | |
| TW | 200945147 A | 11/2009 | |
| WO | WO-03019346 A1 | 3/2003 | |
| WO | WO-2004046905 A3 | 8/2004 | |
| WO | WO-2006054585 A1 | 5/2006 | |
| WO | WO-2007003108 A1 | 1/2007 | |
| WO | WO-2007012256 A1 | 2/2007 | |
| WO | WO-2007102238 A1 | 9/2007 | |
| WO | WO-2008050507 A1 | 5/2008 | |
| WO | WO-2010009655 A1 | 1/2010 | |
| WO | WO-2010137727 A1 | 12/2010 | |

OTHER PUBLICATIONS

Written Opinion of the International Searching Authority, PCT/US2014/058393 dated Jan. 8, 2015, consists of 12 pages.

* cited by examiner

FREQUENCY SHIFTING FOR SIMULTANEOUS ACTIVE MATRIX DISPLAY UPDATE AND IN-CELL CAPACITIVE TOUCH

CROSS-REFERENCE TO RELATED APPLICATIONS

This application claims benefit of U.S. provisional patent application Ser. No. 61/886,025, filed Oct. 2, 2013, entitled "Frequency Shifting for an Integrated Display and Capacitive Sensing Device," and U.S. provisional patent application Ser. No. 62/020,854, filed Jul. 3, 2014, entitled "Frequency Shifting for Synchronized Display Update and Capacitive Sensing." Each of these provisional patent applications is herein incorporated by reference.

BACKGROUND OF THE INVENTION

1. Field of the Invention

Embodiments of the present invention generally relate to a method and apparatus for performing capacitive sensing and display updating in parallel, and more specifically, to maintaining synchronization between a capacitive sensing signal and a display update rate.

2. Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY OF THE INVENTION

One embodiment described herein is an input device that includes a plurality of display electrodes, a plurality of sensor electrodes, and a processing system coupled to the plurality of display electrodes and to the plurality of sensor electrodes. The processing system is configured to drive a display signal onto at least one of the plurality of display electrodes for updating a display. The processing system is further configured to drive a first capacitive sensing signal having a first frequency onto at least one of the plurality of sensor electrodes, wherein the first frequency is synchronized to the display signal. The processing system is further configured to drive a second capacitive sensing signal having a second frequency onto the at least one sensor electrode, wherein the first and second frequencies differ and a timing of the display signal is adjusted to maintain synchronization with the second frequency, and wherein each capacitive sensing signal and the display signal are driven in parallel for at least some period of time.

Another embodiment described herein is a processing system that includes a display module configured to drive a display signal onto at least one of a plurality of display electrodes for updating a display, and a sensing module that is configured to drive a first capacitive sensing signal having a first frequency onto at least one of the plurality of sensor electrodes, wherein the first frequency is synchronized to the display signal. The sensing module is further configured to drive a second capacitive sensing signal having a second frequency onto the at least one sensor electrode, wherein the first and second frequencies differ and a timing of the display signal is adjusted to maintain synchronization with the second frequency, and wherein the capacitive sensing signal and the display signal are driven in parallel for at least some period of time.

Another embodiment described herein is a method that includes driving a display signal onto at least one display electrode for updating a display. The method further includes driving a first capacitive sensing signal having a first frequency onto at least one sensor electrode, wherein the first frequency is synchronized to the display signal. The method further includes driving a second capacitive sensing signal having a second frequency onto the at least one sensor electrode, wherein the first and second frequencies differ and a timing of the display signal is adjusted to maintain synchronization with the second frequency, and wherein each capacitive sensing signal and the display signal are driven in parallel for at least some period of time.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
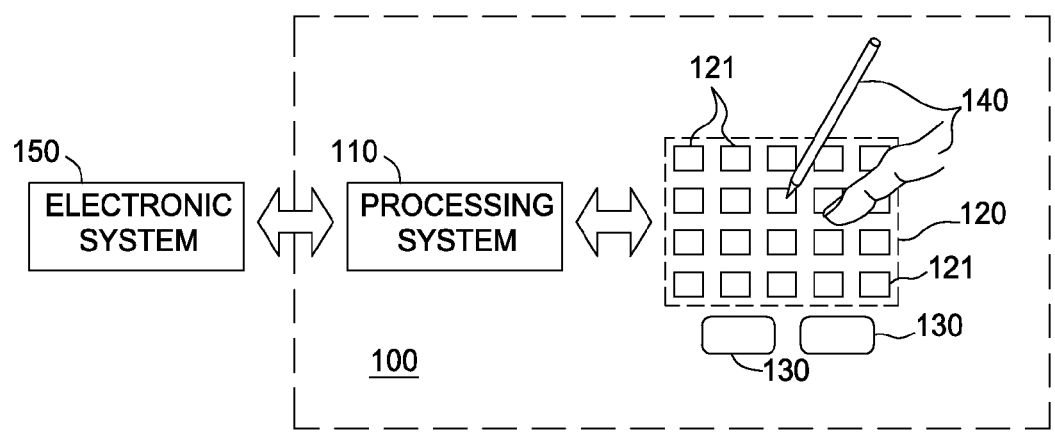
FIG. 1 is a block diagram of an exemplary input device, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for improving usability.

Capacitive sensing in an integrated display (i.e., a display that outputs images in addition to providing a capacitive sensing region) has many challenges including routing and signal settling which can cause deterioration of either the capacitive sensing performance (e.g., a lower signal-to-noise ratio or SNR) or the display performance (e.g., visible artifacts near sensor electrodes). For example, the selection and update of pixels in the integrated display can interfere electrically with the accurate measurement of charge coupling affected by an input object. One solution is to make the display update settling time and the touch sensing update settling time non-overlapping. Doing so prevents the electrical modulation (or change in impedance) of capacitive touch sensing from affecting the voltages or currents in the display pixels (e.g., while the source drivers are coupled to the pixels by the gate line selection) especially in pipelined display updating. However, allowing simultaneous capacitive sensing and display updating can provide significantly improved performance and/or reduce panel requirements. These improvements are due to the significantly increased time that both capacitive sensing and display updating can be performed. Simultaneous display updating and capacitive sensing can be achieved by choosing appropriate update frequency, phase, and/or location of the capacitive sensing signal and display signals.

Embodiments generally provide a method, input device, and processing system for frequency shifting capacitive sensing signals and display signals for synchronized display updating and capacitive sensing. The input device drives a display signal onto at least one display electrode for updating a display. The input device also drives a first capacitive sensing signal having a first frequency onto at least one sensor electrode, where the first frequency is synchronized to the display signal. The input device also drives a second capacitive sensing signal having a second frequency onto the at least one sensor electrode, where the first and second frequencies differ. A timing of the display signal is adjusted to maintain synchronization with the second capacitive sensing signal, and each of the capacitive sensing signals and the display signal are driven in parallel for at least some period of time.

To improve capacitive sensing performance, an input device may synchronize the phase and frequency of the capacitive sensing signal to the display signals in order to mitigate noise between the source lines and sensor electrodes. To avoid interfering noise sources, the input device may adjust the frequency of the capacitive sensing signal. The input device may correspondingly adjust the timing of the display signal in order to maintain the synchronization, and thereby maintain the benefits to capacitive sensing performance.

FIG. 1 is a block diagram of an exemplary input device 100, according to one embodiment presented herein. In various embodiments, the input device 100 comprises a sensing device and optionally a display device (not shown). In other embodiments, the input device 100 comprises a display device having an integrated sensing device, such as a capacitive sensing device. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further examples of electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system 150, or can be physically separate from the electronic system 150. As appropriate, the input device 100 may communicate with parts of the electronic system 150 using any one or more of the following: buses, networks, and other wired or wireless interconnections. Examples include I$^2$C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, behind, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements 121 for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 121 detect loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 121 to create electric fields. In some capacitive implementations, separate sensing elements 121 may be ohmically coupled together to form larger sensor electrodes. Some capacitive implementations utilize resistive sheets, which may be uniformly resistive. Although not shown, the sensing elements 121 may be capacitive sensing pixels that include one or more sensor or other electrodes.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. The change in capacitive coupling may be between sensor electrodes in two different sensing elements 121 or between two different sensor electrodes in the same sensing element 121. In various embodiments, an input object near the sensor electrodes alters the electric field between the sensor electrodes, thus changing the measured capacitive coupling. In one implementation, a transcapacitance sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitter electrodes or receiver electrodes, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) 121 of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen of the display device 101. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), electrowetting, microelectromechanical systems (MEMS), or other display technology. The input device 100 and the display device 101 may share physical elements. For example, some embodiments may utilize some of the same electrical components for displaying and sensing. As another example, the display device 101 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information-bearing media that are readable by electronic processors (e.g., non-transitory computer-readable and/or recordable/writable information-bearing media readable by the processing system 110). Additionally, the embodiments of the present technology apply equally regardless of the particular type of medium used to carry out the distribution. Examples of non-transitory, electronically-readable media include various discs, memory sticks, memory cards, memory modules, and the like. Electronically-readable media may be based on flash, optical, magnetic, holographic, or any other storage technology.

Figure 2A:
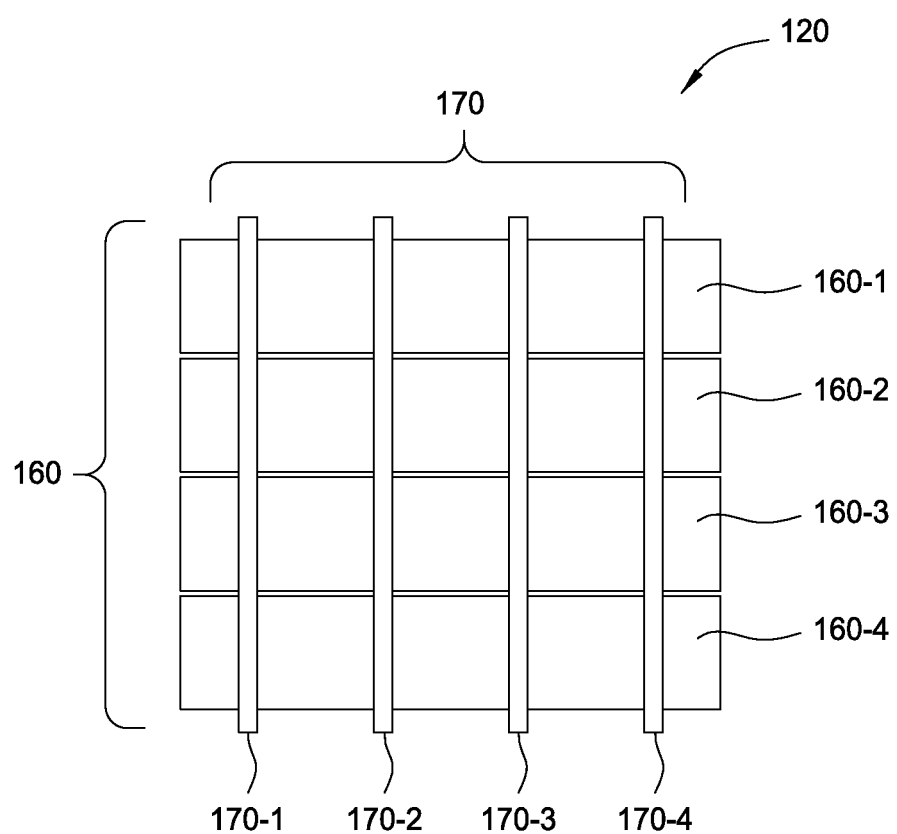
FIGS. 2A-2B illustrate portions of exemplary patterns of sensing elements or capacitive sensing pixels, according to embodiments described herein.

FIG. 2A illustrates a portion of an exemplary pattern of sensing elements configured to sense in a sensing region 120 associated with the pattern, according to some embodiments. For clarity of illustration and description, FIG. 2A shows the sensing elements in a pattern of simple rectangles, and does not show various components. This pattern of sensing elements comprises a first plurality of sensor electrodes 160 (160-1, 160-2, 160-3, . . . 160-n), and a second plurality of sensor electrodes 170 (170-1, 170-2, 170-3, . . . 170-n) disposed over the plurality of transmitter electrodes 160. In one embodiment, this pattern of sensing elements comprises a plurality of transmitter electrodes 160 (160-1, 160-2, 160-3, . . . 160-n), and a plurality of receiver electrodes 170 (170-1, 170-2, 170-3, . . . 170-n) disposed over the plurality of transmitter electrodes 160. In another embodiment, the first plurality of sensor electrodes may be configured to transmit and receive and the second plurality of sensor electrodes may also be configured to transmit and receive.

Transmitter electrodes 160 and receiver electrodes 170 are typically ohmically isolated from each other. That is, one or more insulators separate transmitter electrodes 160 and receiver electrodes 170 and prevent them from electrically shorting to each other. In some embodiments, transmitter electrodes 160 and receiver electrodes 170 are separated by insulative material disposed between them at cross-over areas; in such constructions, the transmitter electrodes 160 and/or receiver electrodes 170 may be formed with jumpers connecting different portions of the same electrode. In some embodiments, transmitter electrodes 160 and receiver electrodes 170 are separated by one or more layers of insulative material. In such embodiments, the transmitter electrodes and receiver electrodes may be disposed on separate layers of a common substrate. In some other embodiments, transmitter electrodes 160 and receiver electrodes 170 are separated by one or more substrates; for example, they may be disposed on opposite sides of the same substrate, or on different substrates that are laminated together.

The areas of localized capacitive coupling between transmitter electrodes 160 and receiver electrodes 170 may be termed "capacitive pixels." The capacitive coupling between the transmitter electrodes 160 and receiver electrodes 170 change with the proximity and motion of input objects in the sensing region associated with the transmitter electrodes 160 and receiver electrodes 170.

In some embodiments, the sensor pattern is "scanned" to determine these capacitive couplings. That is, the transmitter electrodes 160 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 170 to be independently determined.

The receiver sensor electrodes 170 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The baseline capacitance of a sensor device is the capacitive image associated with no input object in the sensing region. The baseline capacitance changes with the environment and operating conditions, and may be estimated in various ways. For example, some embodiments take "baseline images" when no input object is determined to be in the sensing region, and use those baseline images as estimates of their baseline capacitances.

Capacitive images can be adjusted for the baseline capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, sensor electrodes 160 comprise one or more display electrodes (e.g., a segment of a segmented "Vcom" electrode, gate electrode, source driver electrode, anode electrode, or cathode electrode) used in updating the display of the display screen. These common electrodes may be disposed on an appropriate display screen substrate. For example, the common electrodes may be disposed on a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. The common electrode can also be referred to as a "combination electrode" since it performs multiple functions. In various embodiments, each sensor electrode 160 comprises one or more combination electrodes. In other embodiments, at least two sensor electrodes 160 may share at least one combination electrode. Furthermore, in one embodiment both the sensor electrodes 160 and the sensor electrodes 170 are both disposed within a display stack on the display screen substrate. Additionally, at least one of the sensor electrodes 160, 170 in the display stack may comprise a combination electrode. However, in other embodiments, only the sensor electrodes 160 or sensor electrodes 170 (but not both) are disposed within the display stack while other sensor electrodes are outside of the display stack (e.g., disposed on an opposite side of a color filter glass).

In various touch screen embodiments, the "capacitive frame rate" (the rate at which successive capacitive images are acquired) may be the same or may differ from that of the "display frame rate" (i.e., the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the baseline capacitive image. In various embodiments, the display updating effect may be due to a change in capacitance or a change in injected charge while changes in capacitance are measured. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in the sensing region. This is more likely where the capacitive sensing and display updating electrodes are in close proximity to each other, or when they are shared (e.g., combination electrodes). In various embodiments, the capacitive frame rate is an integer multiple of the display frame rate. For example, for a display frame rate of 60 Hertz (Hz), the capacitive frame rate may be any one of 120 Hz, 180 Hz, 240 Hz, etc. However, other display frame rates and capacitive frame rates are possible. In other embodiments, the capacitive frame rate is a fractional multiple of the display frame rate. For example, for a display frame rate of 60 Hz, the capacitive frame rate may be 90 Hz. However, other display frame rates and capacitive frame rates are possible. In yet further embodiments, the capacitive frame rate may be any fraction or integer of the display frame rate. For example, for a display frame rate of 48 Hz, the capacitive frame rate may be 100 Hz. However, other display frame rates and capacitive frame rates are possible.

For convenience of explanation, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a first display updating state is considered to be of a third frame type, and so on. Where the relationship of display update state and capacitive image acquisition is periodic, capacitive images acquired cycle through the frame types and then repeats. In some embodiments, there may be "n" capacitive images for every display updating state.

Figure 2B:
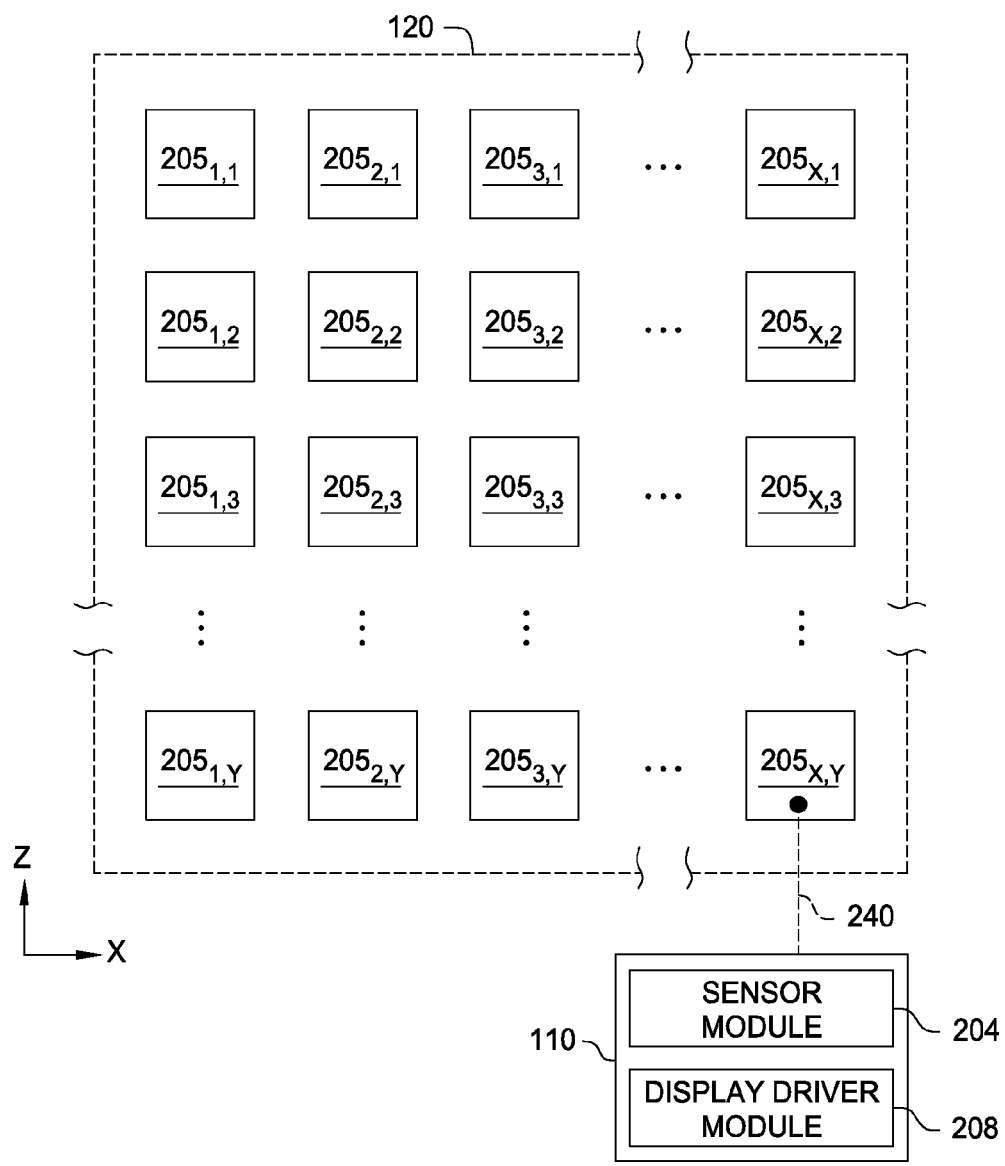

FIG. 2B illustrates a portion of an exemplary pattern of capacitive sensing pixels 205 (also referred to herein as capacitive pixels or sensing pixels) configured to sense in the sensing region 120 associated with a pattern, according to some embodiments. Each capacitive pixel 205 may include one of more of the sensing elements described above. For clarity of illustration and description, FIG. 2B presents the regions of the capacitive pixels 205 in a pattern of simple rectangles and does not show various other components within the capacitive pixels 205. In one embodiment, the capacitive sensing pixels 205 are areas of localized capacitance (capacitive coupling). Capacitive pixels 205 may be formed between an individual sensor electrode and ground in a first mode of operation (i.e., absolute sensing) and between groups of sensor electrodes used as transmitter and receiver electrodes in a second mode of operation (i.e., transcapacitive sensing). The capacitive coupling changes with the proximity and motion of input objects in the sensing region 120 associated with the capacitive pixels 205, and thus may be used as an indicator of the presence of the input object in the sensing region 120 of the input device.

The exemplary pattern comprises an array of capacitive sensing pixels $205_{X,Y}$ (referred collectively as pixels 205) arranged in X columns and Y rows, wherein X and Y are positive integers, although one of X and Y may be zero. It is contemplated that the pattern of sensing pixels 205 may comprises a plurality of sensing pixels 205 having other configurations, such as polar arrays, repeating patterns, non-repeating patterns, non-uniform arrays a single row or column, or other suitable arrangement. Further, as will be discussed in more detail below, the sensor electrodes in the sensing pixels 205 may be any shape such as circular, rectangular, diamond, star, square, noncovex, convex, non-concave concave, etc. As shown here, the sensing pixels 205 are coupled to the processing system 110 and utilized to determine the presence (or lack thereof) of an input object in the sensing region 120. In one or more embodiments, each sensor electrode 205 overlaps one or more source lines. Each source line is capacitively coupled to the sensor electrode, and when the voltage on source lines is changed, charge may be injected into the sensor electrode. This injected charge may cause errors within the measured change in capacitance. In one or more embodiments, the charge injected by each source line coupled to a sensor electrode may be subtracted. Further, in other embodiments, an average amount of charge injected by each source line coupled to a sensor electrode may be subtracted. In yet other embodiments, a reference electrode may be disposed such that it overlaps a common set of source lines with at least one sensor electrode of sensor electrodes 205. A resulting signal that corresponds to charge received from the source lines and injected into the reference electrode may be subtracted from the resulting signal of each corresponding sensor electrode.

In a first mode of operation, at least one sensor electrode within the capacitive sensing pixels 205 may be utilized to detect the presence of an input object via absolute sensing techniques. A sensor module 204 in processing system 110 is configured to drive a sensor electrode in each pixel 205 with a modulated signal and measure a capacitance between the sensor electrode and the input object (e.g., free space or earth ground) based on the modulated signal, which is utilized by the processing system 110 or other processor to determine the position of the input object. In various embodiments, these modulations of the sensor electrodes are accomplished by changing the voltage of the sensor electrodes relative to a system ground of an input device, where the system ground is separately coupled to earth ground.

The various electrodes of capacitive pixels 205 are typically ohmically isolated from the electrodes of other capacitive pixels 205. Additionally, where a pixel 205 includes multiple electrodes, there electrodes may be ohmically isolated from each other. That is, one or more insulators separate the sensor electrodes and prevent them from electrically shorting to each other. Furthermore, in one embodiment, the sensor electrodes in the capacitive pixels 205 may be ohmically insulated from a grid electrode (not shown) that is between the capacitive pixels 205. In one example, the grid electrode may surround one or more of the capacitive pixels 205. The grid electrode may be used as a shield or to carry a guarding signal for use when performing capacitive sensing with the sensor electrodes in the pixels 205. Alternatively or additional, the grid electrode may be used as sensor electrode when performing capacitive sensing. Furthermore, the grid electrode may be co-planar with the sensor electrodes in the capacitive pixels 205 but this is not a requirement. For instance, the grid electrode may be located on a different substrate or on a different side of the same substrate as the sensor electrodes. In various embodiments, the power supply of the display device or an associated power supply of the display device may be modulated relative to system ground such that the reference voltage(s) provided are modulated.

In a second mode of operation, sensor electrodes in the capacitive pixels 205 are utilized to detect the presence of an input object via transcapacitance sensing techniques. That is, processing system 110 may drive at least one sensor electrode in a pixel 205 with a transmitter signal and receive resulting signals using one or more of the other sensor electrodes in the pixel 205, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

In some embodiments, the capacitive pixels 205 are "scanned" to determine these capacitive couplings. That is, in one embodiment, one or more of the sensor electrodes are driven to transmit transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The sensor electrodes configured as receiver sensor electrodes may be operated singly or multiply to acquire resulting signals. The resulting signals may be used to determine measurements of the capacitive couplings at the capacitive pixels 205.

In other embodiments, "scanning" pixels 205 to determine these capacitive coupling includes driving with a modulated signal and measuring the absolute capacitance of one or more of the sensor electrodes. In another embodiment, the sensor electrodes may be operated such that the modulated signal is driven on a sensor electrode in multiple capacitive pixels 205 at the same time. In such embodiments, an absolute capacitive measurement may be obtained from each of the one or more pixels 205 simultaneously. In one embodiment, the input device 100 simultaneously drives a sensor electrode in a plurality of capacitive pixels 205 and measures an absolute capacitive measurement for each of the pixels 205 in the same sensing cycle. In various embodiments, processing system 110 may configured to selectively drive and receive with a portion of sensor electrodes. For example, the sensor electrodes may be selected based on, but not limited to, an application running on the host processor, a status of the input device, an operating mode of the sensing device and a determined location of an input device. In various embodiments, all of sensor electrodes 205 may be simultaneously modulated and a grid electrode may be modulated to operate as a guard electrode relative to a system ground, while selected sensor electrodes 205 are received with and measured via a multiplexer, such that a selected region of the sensing region 120 may be sensed at a time. In one embodiment, the selected region may be selected such that it is positioned away from gate lines driven for display updating. In one or more embodiments, scanning may occur while the sensor electrodes are not modulated but are received to obtain a measurement of the interference.

A set of measurements from the capacitive pixels 205 form a capacitive image (also capacitive frame) representative of the capacitive couplings at the pixels 205 as discussed above. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some embodiments, one or more of the sensor electrodes in the capacitive pixels 205 include one or more display electrodes used in updating the display of the display screen. In one or more embodiment, the display electrodes comprise one or more segments of a Vcom electrode (common electrodes), a source drive line, gate line, an anode electrode or cathode electrode, or any other display element. These display electrodes may be disposed on an appropriate display screen substrate. For example, the electrodes may be disposed on a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, an electrode that is used as both a sensor and a display electrode can also be referred to as a combination electrode, since it performs multiple functions. In one embodiment, all of the sensor electrodes in the capacitive pixels 205 are disposed in a display stack on the display screen substrate. Furthermore, at least one of the sensor electrodes in the display stack may be a combination electrode. However, in other embodiments, only a portion of the sensor electrodes in capacitive pixels 205 are disposed within the display stack while other sensor electrodes are outside of the display stack (e.g., disposed on an opposite side of a color filter glass).

Continuing to refer to FIG. 2B, the processing system 110 coupled to the sensing electrodes includes a sensor module 204 and optionally, a display driver module 208. In one embodiment the sensor module comprises circuitry configured to drive a transmitter signal or a modulated signal onto and receive resulting signals with the resulting signals the sensing electrodes during periods in which input sensing is desired. In one embodiment the sensor module 204 includes a transmitter module including circuitry configured to drive a transmitter signal onto the sensing electrodes during periods in which input sensing is desired. The transmitter signal is generally modulated and contains one or more bursts (sensing cycles) over a period of time allocated for input sensing. The transmitter signal may have an amplitude, frequency and voltage which may be changed to obtain more robust location information of the input object in the sensing region. The transmitter may couple to a modulated power supply domain, such that the display electrodes are modulated relative to a system ground. Further, in various embodiments, the transmitter may be separate from or included with a source driver. The modulated signal used in absolute capacitive sensing may be the same or different from the transmitter signal used in transcapacitance sensing. The modulated signal may also be referred to as an absolute capacitive sensing signal. The sensor module 204 may be selectively coupled to one or more of the sensor electrodes in the capacitive pixels 205. For example, the sensor module 204 may be coupled to selected portions of the sensor electrodes and operate in either an absolute or transcapacitance sensing mode. In another example, the sensor module 204 may be coupled to different sensor electrodes when operating in the absolute sensing mode than when operating in the transcapacitance sensing mode.

In various embodiments the sensor module 204 may comprise a receiver module that includes circuitry configured to receive a resulting signal with the sensing electrodes comprising effects corresponding to the transmitter signal during periods in which input sensing is desired. In one or more embodiments, the receiver module is configured to drive a modulated signal onto a first sensor electrode in one of the pixels 205 and receive a resulting signal corresponding to the modulated signal to determine changes in absolute capacitance of the sensor electrode. The receiver module may determine a position of the input object in the sensing region 120 or may provide a signal including information indicative of the resulting signal to another module or processor, for example, a determination module or a processor of the electronic device (i.e., a host processor or a timing controller with integrated sensor processor), for determining the position of the input object in the sensing region 120. In one or more embodiments, the receiver module comprises a plurality of receivers, where each receiver may be an analog front end (AFE). Further, at least a portion of the receiver module may be disposed within a source driver.

In one or more embodiments, capacitive sensing (or input sensing) and display updating may occur during at least partially overlapping periods. For example, as a combination electrode is driven for display updating, the combination electrode may also be driven for capacitive sensing. Or overlapping capacitive sensing and display updating may include modulating the reference voltage(s) of the display device and/or modulating at least one display electrode for a display in a time period that at least partially overlaps with when the sensor electrodes are configured for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In these embodiments, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes for capacitive sensing during any one or more of or any combination of the different non-display update times. Non-display update periods may be used for sensing other than touch sensing (e.g., interference measurements, active modulated inputs). In various embodiments, non-display update periods may be used to maintain constant display frame rates while the line rate is changing for input sensing, such that neither display updating nor input sensing are significantly affected (i.e., maintaining a constant input sensing report rate, display refresh rate, and the like).

The display driver module 208 includes circuitry confirmed to provide display image update information to the display of the display device during non-sensing (e.g., display updating) periods. The display driver module 208 may be included with or separate from the sensor module 204. In one embodiment, the processing system comprises a first integrated controller comprising the display driver module 208 and at least a portion of the sensor module 204 (i.e., transmitter module and/or receiver module). In another embodiment, the processing system comprises a first integrated controller comprising the display driver 208 and a second integrated controller comprising the sensor module 204. In yet another embodiment, the processing system comprises a first integrated controller comprising a display driver module 208 and one of a transmitter module or a receiver module and a second integrated controller comprising the other one of the transmitter module and receiver module.

Figure 3:
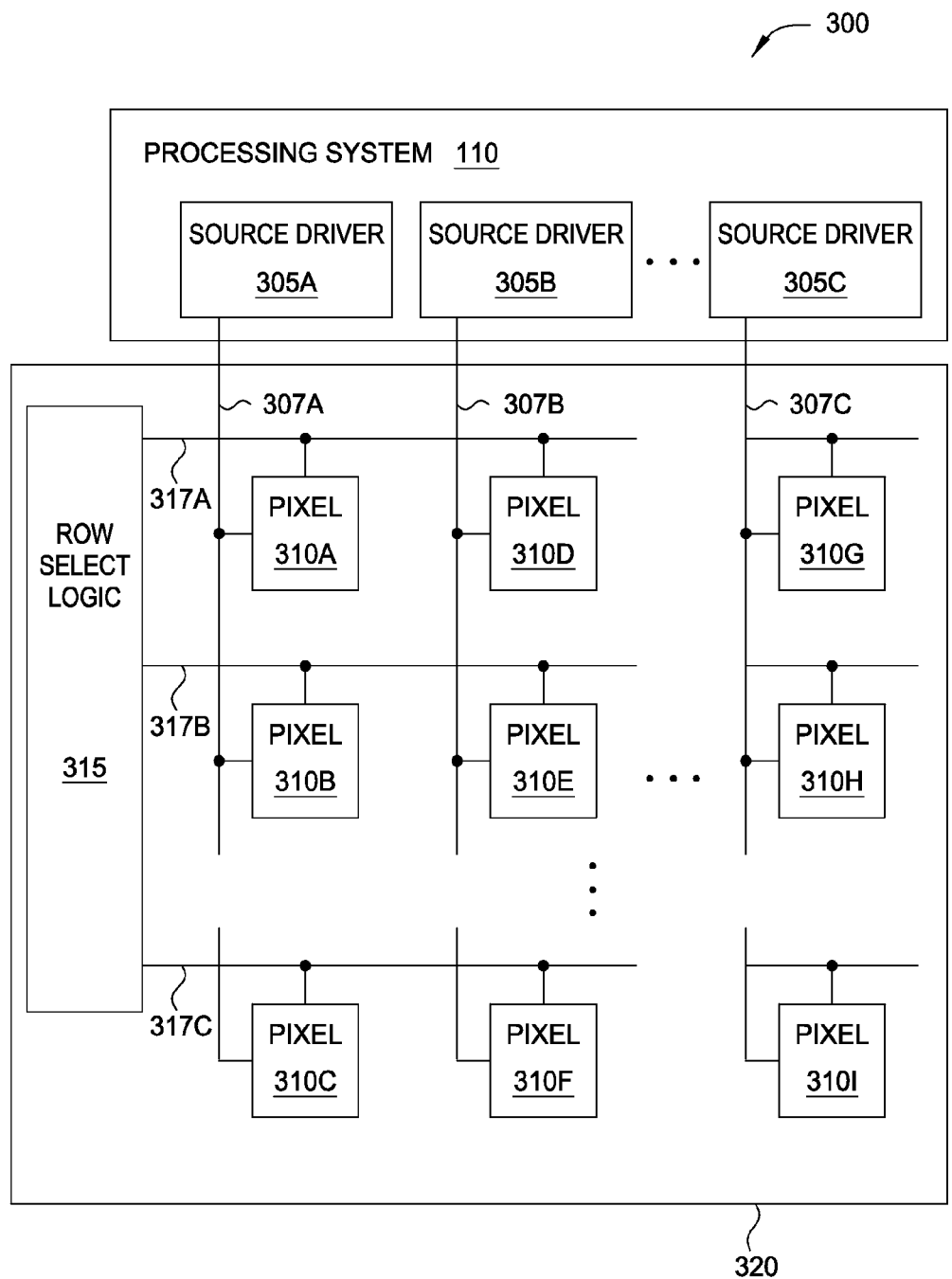
FIG. 3 is a schematic block diagram of a display device, according to one embodiment described herein.

FIG. 3 is a schematic block diagram of a display device 300, according to one embodiment described herein. Specifically, the display device 300 of FIG. 3 may be integrated with an input device and includes processing system 110 and display screen 320. Processing system 110 includes one or more source drivers 305 that are each associated with one or more source lines 307 (also referred to as column lines) in the display screen 320. In one embodiment, processing system 110 and display screen 320 are separate components. For example, the processing system 110 may be an ASIC that is communicatively coupled to the display screen 320 via one or more transmission lines. However, in one embodiment, processing system 110 may be integrated into display screen 320 (e.g., mounted on a common substrate) to form a single component. In various embodiments, processing system 110 may further comprise one or more of a timing controller (Tcon) and power management integrated circuit (s) (PMIC). The timing controller may be disposed within a first integrated circuit and a source driver is disposed within a second integrated circuit. Further, in various embodiments, the timing controller is configured to receive at least one of processed, partially processed, or unprocessed data from a source driver comprising at least a portion of a transmitter or receiver module. The timing controller may be configured to process the data to determine positional information, gestural information, and/or interference information. The timing controller may be configured to communicate control signals to source drivers 305 and row select logic 315, the control signals being based on display data from a host processor. The timing controller may report sensor data to the host processor that includes positional information. In one or more embodiments, the timing controller may be configured to signal the host processor to enter or exit a lower power mode based on the positional information. In various embodiments, the timing controller may be configured to update the display while the host is in a low power state. The timing controller may control one of capacitive sensing timing and display line rate timing. Further the timing controller may be configured to control capacitive sensing functions, such as operating sensor electrodes for transcapacitive sensing, operating sensor electrodes for absolute capacitive sensing, and/or selecting sensor electrodes to operate for transcapacitive sensing and absolute capacitive sensing and when to operate the sensor electrodes for transcapacitive sensing and absolute capacitive sensing. Further, the timing controller may be configured to initiate a non-display update time. In one or more embodiments, the power management integrated circuit provides power signals and regulated voltages to the source drivers and row select logic (i.e., gate select logic). The power management integrated circuit may generate common voltages and gamma voltages.

The source drivers 305 may receive an input voltage signal which is amplified and transmitted on the source lines 307. Display screen 320 includes one or more pixels 310 coupled to row select logic 315 via respective gate lines 317 (also referred to as "rows" or "lines"). The pixels 310 (in contrast to the capacitive pixels discussed above) may be used to display an image on the display screen 320. The pixels 310 may be used in a light emitting diode (LED), organic LED (OLED), cathode ray tube (CRT), liquid crystal display (LCD), plasma, electroluminescence (EL), or other display technology to display the image.

To update a particular pixel 310, the row select logic 315 activates one of the gate lines 317. In one embodiment, each pixel 310 may contain a switching element that permits the voltage of the source line 307 to change the color emitted by the pixel 310. For example, to update pixel 310D, row select logic 315 using gate line 317A to control the switching element such that the voltage generated by source driver 305B changes the voltage associated with pixel 310D. By coordinating the row select logic 315 with the voltages transmitted by the source drivers 305, the processing system 110 and display screen 320 may set the pixels 310 to respective voltages.

In one embodiment, as discussed above, processing system 110 and display screen 320 may include touch-sensing circuitry and logic for supporting user input. For the sake of clarity, the embodiments provided below do not discuss touch sensing functions. However, these functions are explicitly contemplated. That is, the display circuitry and functions discussed herein may be combined with additional circuitry for enabling user input via touch-sensing.

Figure 4:
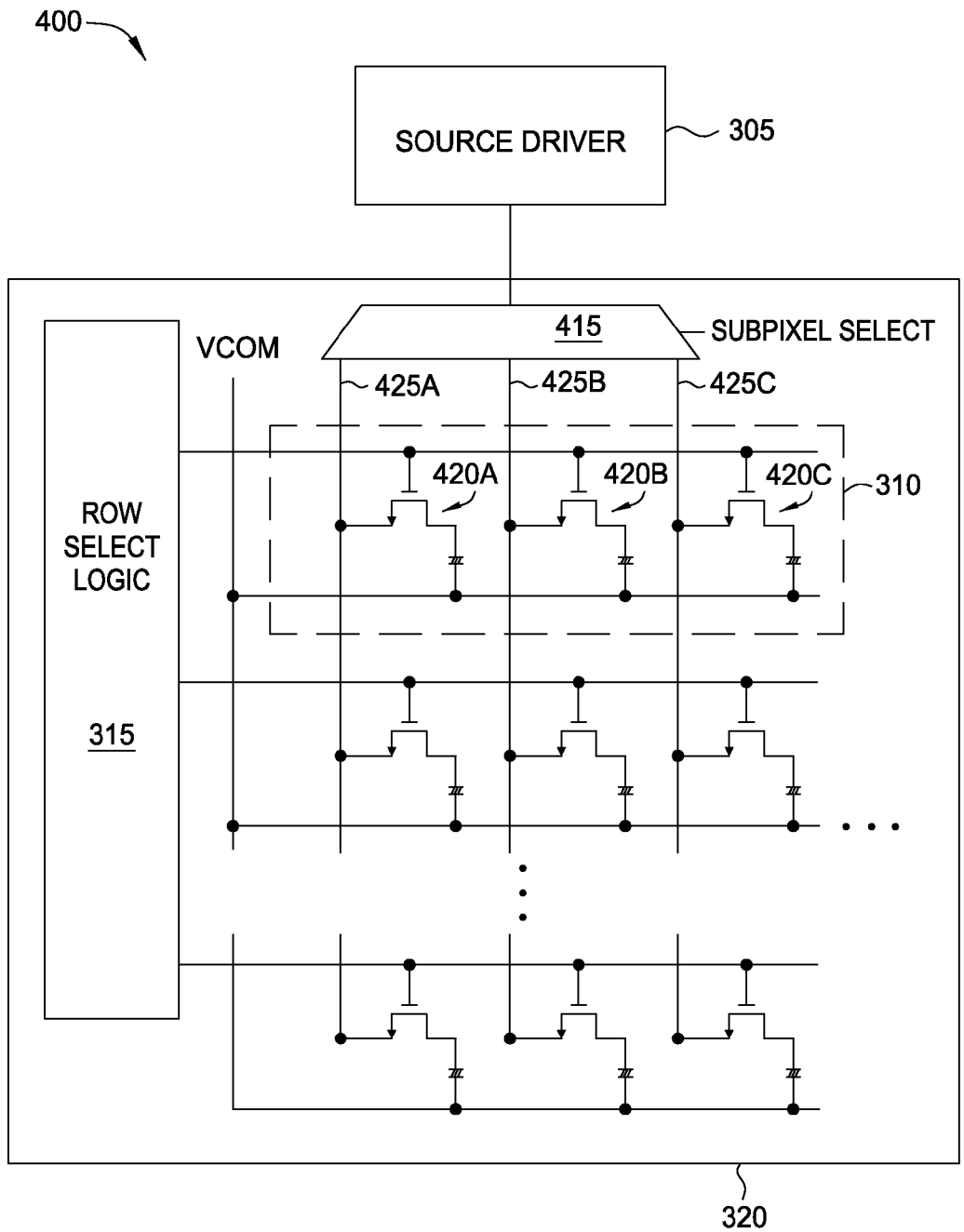
FIG. 4 illustrates a system for updating a source line in a display device, according to one embodiment described herein.

FIG. 4 illustrates a system 400 for updating a source line 425 in a display device, according to one embodiment described herein. Specifically, system 400 includes source driver 305 (i.e., one of the source drivers shown in FIG. 3) coupled to plurality of source lines 425 in display screen 320. As shown here, each source driver 305 is coupled to three source lines 425 which are each associated with a respective sub-pixel 420. In this embodiment, the pixels 310 are divided into three sub-pixels 420 that are combined to provide the color associated with the pixel 310—e.g., sub-pixel 420A is the red sub-pixel, sub-pixel 420B is the green sub-pixel, and sub-pixel 420C is the blue sub-pixel. Accordingly, when setting the voltage, and thus, the color of a pixel 310, source driver 305 may use three separate drive phases, one for each sub-pixel 420. To select between the different sub-pixel source lines 425, display screen 320 include multiplexer (mux) 415. Based on a sub-pixel select signal, mux 415 permits the voltage transmitted by source driver 305 to reach only one of the three source lines 425 at any given time. Thus, each source driver 305 may use only one wire to transmit three unique voltages to each sub-pixel source line 425. Moreover, each pixel is shown including a capacitor representing a liquid crystal pixel, but as discussed above, the display screen is not limited to this type. In one or more embodiments, the row select logic may be configured to select a display line to update using "pipelining." In these embodiments, multiple display lines are driven at one time in an overlapping manner. As a display line reaches the "turn-on" voltage, the display line is updated.

Although FIG. 4 illustrates one source driver selectively coupled to three source lines, the present disclosure is not limited to such. Instead, the embodiments described herein may be used in display devices that use a source driver to driver any number of source lines. Moreover, FIG. 4 illustrates using one select signal to couple the source lines 425 to the source driver 305 but in other embodiments it may be preferred to use three different control signals to permit access to the sub-pixels 420. As will be discussed in greater detail below, the three different control signals may be used to interconnect the source lines 425 to each other (e.g., source lines 425A-C are interconnected to discharge the built up charge. Further, in the embodiment depicted in FIG. 4, the Vcom electrode is illustrated as being perpendicular to source lines 425. In various embodiments, the Vcom electrode may be segmented, where each segment may be disposed substantially parallel to the source lines 424. Further, one segment may correspond to each of the sub-pixels 420, or a respective segment may correspond to each sub-pixel 420A, 420B, and 420C. The Vcom electrode segments may be coupled to and selectively driven using multiplexer 415; however, in various embodiments a second multiplexer may be used. In one or more embodiments, at least a portion of sensor module 204 (i.e., a portion of a receiver module, transmitter module and/or the like) may be disposed with multiplexer 415. In various embodiments, the multiplexer 415 may be disposed on a substrate of the display device as a discrete component or as part of the source driver 305.

Figure 5:
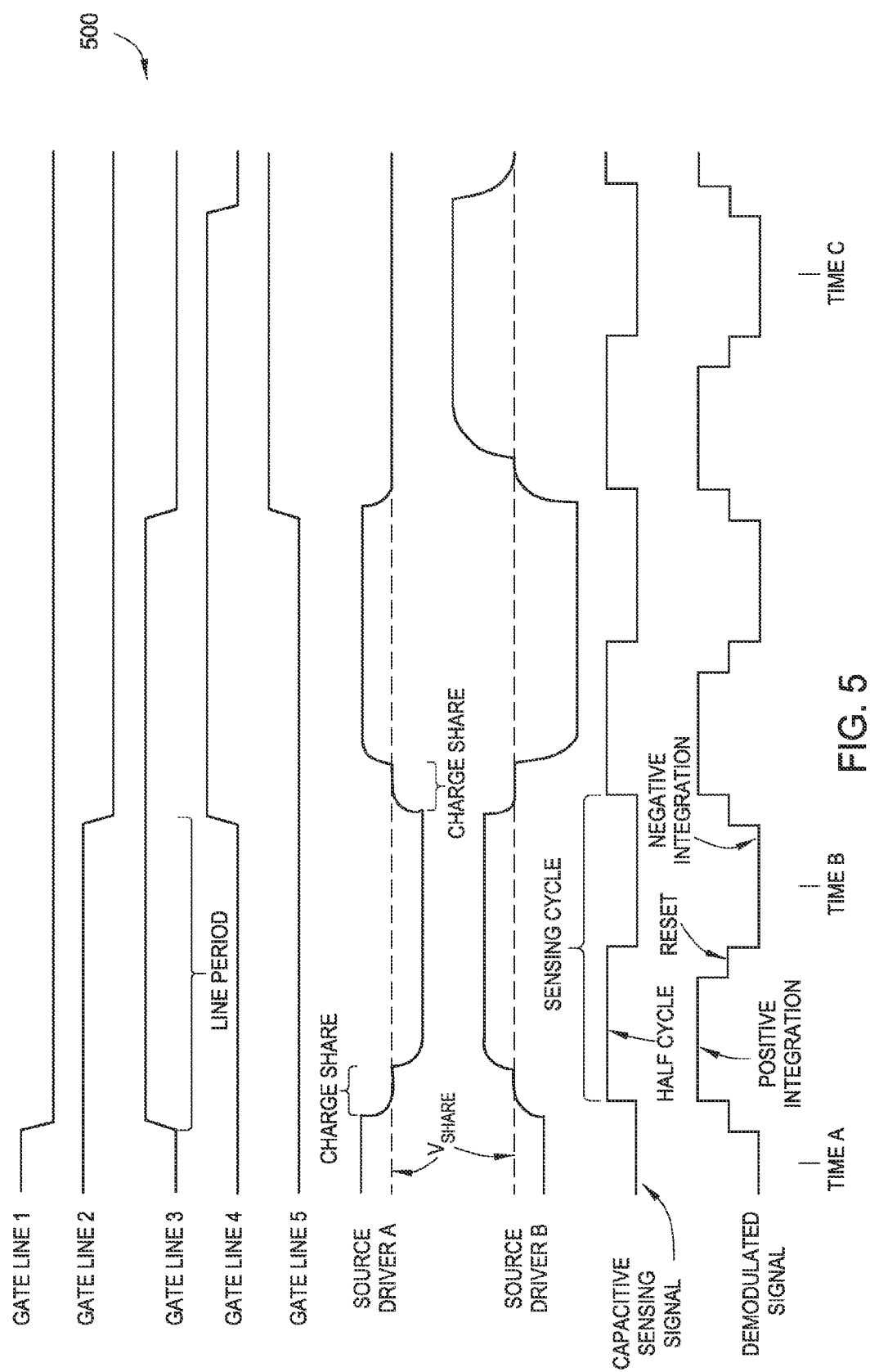
FIG. 5 illustrates timing chart 500 for synchronizing capacitive sensing with display updating, according to embodiments described herein.

FIG. 5 illustrates timing chart 500 for synchronizing capacitive sensing with display updating, according to embodiments described herein. Specifically, FIG. 5 includes a timing chart 500 that illustrates the signals driven on gate lines 1-5, source drivers A and B, a capacitive sensing signal on a sensor electrode, and a demodulated signal based on the capacitive sensing signal. The capacitive sensing signal may be a signal used to perform absolute capacitive sensing and/or transcapacitive sensing. The sensor electrodes may be substantially stationary relative to a common voltage (e.g., a Vcom voltage or other constant voltage), or may be modulated relative to a common voltage. In one embodiment, gate line 1-5 are arranged sequentially in a display screen such that gate line 1 permits source drivers A and B to change the voltage on pixels in a first row, gate line 2 permits source drivers A and B to change the voltage on pixels in a second row adjacent to the first row, gate line 3 permits source drivers A and B to change the voltage on pixels in a third row adjacent to the second row, and so forth. It is further assumed in FIG. 5 that the source drivers A and B set the voltage on pixels (or sub-pixels) that are in adjacent columns in the display screen.

Figure 6:
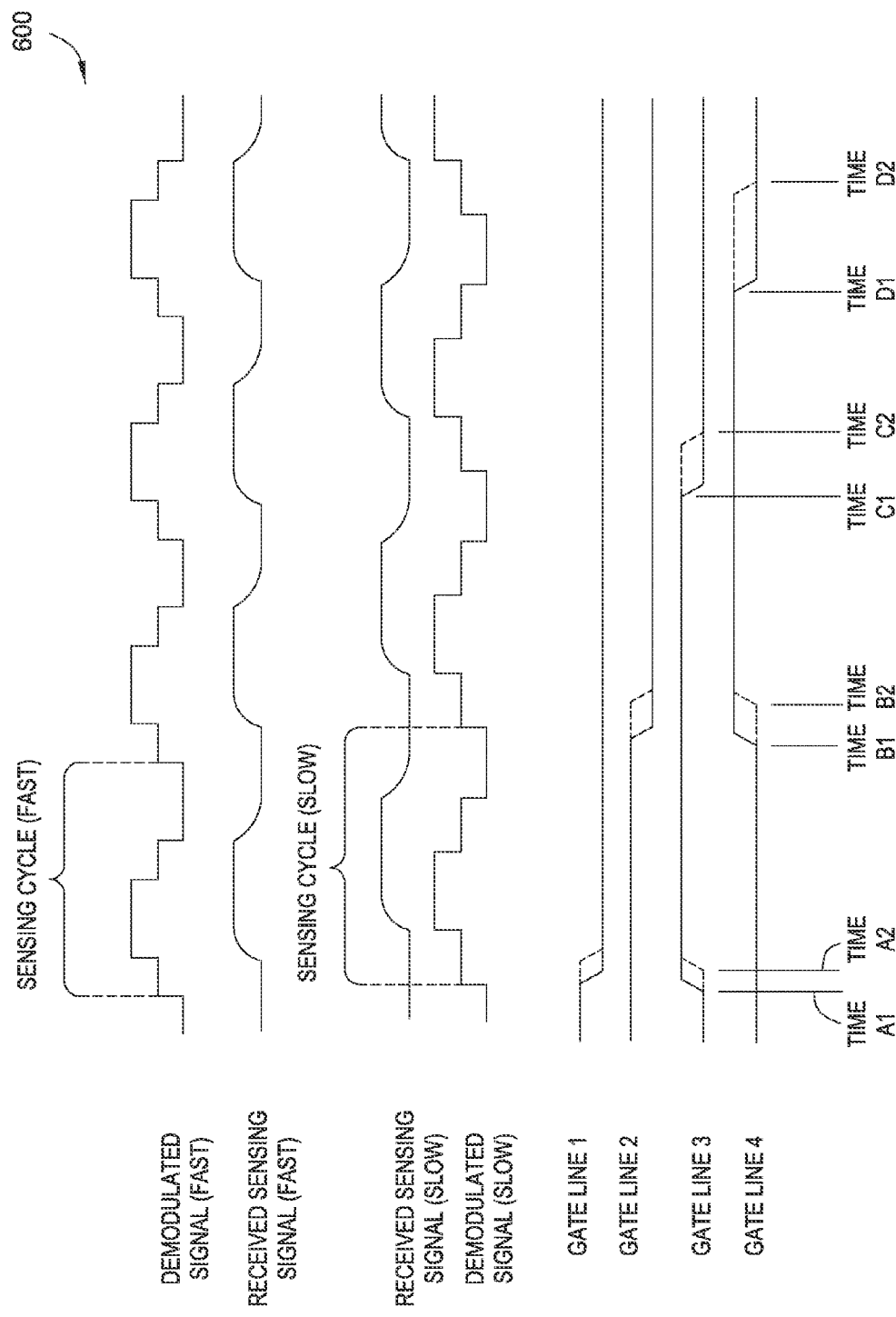
FIG. 6 illustrates a timing chart 600 for synchronizing capacitive sensing with display updating, according to embodiments described herein.

In FIG. 5, the gate lines 1-5 are shown as pipelined gate lines (e.g., multiple gate lines may be selected at the same time). In some display screens, the transistor coupled to the gate lines requires more time to turn on than to turn off. Stated differently, it takes longer for the transistor to electrically connect the output of the source driver to the pixel (so that the source driver can set the voltage across the pixel) than to electrically disconnect the source driver from the pixel. As a result, the gate lines may be pipelined so that the time period that one gate line is activated at least partially overlaps with the time period that another gate line is activated. By activating the gates lines earlier, this provides time for the signal to settle so that when that corresponding row is being updated, the correct voltage is set across the pixel. However, by activating the gate lines earlier, this may result in the source drivers A and B changing the voltage across the pixels on both rows. For example, at time A, both gate lines 1 and 2 are active, and thus the source drivers A and B may affect the voltages on the corresponding pixels on both rows, although the voltage being driven by the source drivers is only intended for the row corresponding to gate line 1. However, at time B, gate line 1 is turned off while gate line 2 is still active and the outputs of the source drivers A and B have changed to the desired voltage for the row corresponding to gate line 2. Thus, any undesired change in voltage caused when gate lines 1 and 2 overlapped at time A is corrected at time B when gate line 1 is deactivated and the correct voltage is outputted by source drivers A and B. Although gate pipelining is shown in FIGS. 5 and 6, the embodiments described herein may also be applied to an input device where the gate lines are non-overlapping.

In one or more embodiments, capacitive sensing occurs during a non-display update period. With reference to FIG. 5, the non-display update period may occur between the time when gate lines 3 and 4 are selected. As such, display updating is paused after gate line 3 is selected and before gate line 4 is selected. In one embodiment, after the non-display update period, gate line 3 may be selected and driven before selecting and driving gate line 4. In another embodiment, after the non-display update period, the display is delayed for an additional period of time to allow gate line 4 to reach the appropriate "turn-on" voltage. In one or more embodiments, to avoid display artifacts caused by variable gate select times, various gate signals may be shortened or lengthened, gate voltage swings may be raised or lowered, or gate selection sequences may be replayed. In embodiments where a single gate line is selected at a time, the gate turn-on time may be maintained constant to avoid display artifacts.

Generally, timing chart 500 illustrates updating pixels in the same two columns during four consecutive line updates. The voltages on the pixels may be the same or different depending on the data included within a received data frame. For instance, at time A, the voltages applied by source drivers A and B are equal in amplitude but opposite in polarity. The polarity of the voltages may not affect the brightness of the pixel (e.g., the brightness may instead be affected by amplitude or power), and thus, the voltages across the two pixels updated at time A represent the same color. Furthermore, timing chart 500 illustrates using one of the inversion schemes discussed above. Specifically, timing chart 500 illustrates an inversion scheme where the source drivers A and B output different voltage polarities each time they update subsequent rows, which is a feature of dot inversion, pixel inversion, and line inversion. In addition, timing chart 500 illustrates that the voltage polarity between pixels in the same row and adjacent columns have opposite polarities, as is done in dot inversion and pixel inversion, but this is not a requirement. For instance, if a line inversion scheme is used instead of dot or pixel inversion, the output polarities of source drivers A and B may be the same during a line or row update (i.e., on the same side of $V_{SHARE}$) and both switch to the opposite polarity during a subsequent line update. Furthermore, although timing chart 500 does not show using other inversion schemes (such as column inversion or frame inversion) in which the source drivers do not change polarity on each subsequent line update, the ability to synchronize the phase and frequency of the capacitive sensing signals and the display signals to achieve simultaneous capacitive sensing and display updating as discussed herein also applies to these inversion schemes.

Inversion techniques may include dot (or pixel) inversion, line inversion, column inversion, or frame inversion that describe various distributions of pixel polarity at a given time. For example, in column inversion, the source drivers drive all the pixels of a first column of the display to a positive polarity (regardless of the amplitude of the voltage corresponding to the color data) when updating for a first display frame. The pixels of the immediately adjacent pixel columns (i.e., the next column to the left and/or the next column to the right) are driven to a negative polarity for the first frame. When updating pixels to display the next frame, the first column's pixels are driven negative while those of the adjacent column(s) are driven positive. In various embodiments, inversion techniques allow for a constant or changing amplitude and/or power to be applied to each sub-pixel with a reduced average current.

When switching output polarities of source drivers A and B between line updates, in one embodiment, the input device may use charge share periods between driving source drivers for line updates to conserve power. For instance, in a dot inversion scheme, each row has sub-pixels charged to opposite polarities. Assuming that there are an even number of pixels in a particular row, the input device has an equal number of voltages with a positive polarity and a negative polarity on each row. Moreover, the source drivers must drive voltages with opposite polarities during each subsequent line update. That is, the source drivers must drive a pixel from a positive polarity to a negative polarity (or vice versa) during each of the line updates. In addition, the source driver amplifiers may need to deal with the latent charge stored on the source line from the previous line update. To conserve power, the input device may use the charge share periods illustrated in timing chart 500. During this time period, the source lines coupled to the source drivers A and B may be connected to a common node, thereby permitting each of the sources lines to share charge. Depending on the amplitude values of the voltages on each pixel/source line, the voltages on the source lines go to $V_{SHARE}$, which may be approximately equal to display ground (e.g., Vcom). $V_{SHARE}$ may be different than the system ground because the amplitudes of the pixel voltages depend on the color the data frame assigns to each pixel. For example, at time A, source drivers A and B output voltages with the same amplitude but different polarity onto their respective sub-pixels, but at time C, source driver A outputs a low amplitude voltage (e.g., a dark pixel) while source driver B outputs the maximum voltage (e.g., a bright pixel). As the pixels (comprised of sub-pixels RGB, RGBW, RGBY, etc.) in a row may have various different colors, there may be more total positive charge than total negative charge in the source lines (or vice versa). Nonetheless, this variation (for typical uniform or slowly charging brightness gradients) is usually slight and the negatively and positively charged source lines equalize to $V_{SHARE}$, which is typically near Vcom. Alternatively or additionally, the source lines and the $V_{SHARE}$ voltage may be connected to the Vcom voltage for a portion of time (e.g., at the beginning or end of a capacitive measurement) or to a highly filtered voltage that changes slowly relative to a reference voltage (e.g., coupled to a large capacitor). After a charge share event, the source lines are returned to Vcom without the input device expending power to do so. Furthermore, in one embodiment, $V_{SHARE}$ may be offset from Vcom by an amount to compensate for charge subtraction from gate capacitive coupling.

Once the charge share is complete, the input device may then power the source drivers A and B to then drive the desired voltages onto the pixels in the activated row. Thus, the source drivers A and B need only drive the source lines from the value of $V_{SHARE}$ to the desired voltages, rather than from voltages that have an opposite polarity. However, in other embodiments, charge sharing may not be used. For instance, in line inversion where all the pixels of a source line may be driven to the same polarity during each line update, charge sharing between line updates may not be used.

In addition to updating the pixels in the display, timing chart 500 illustrates driving a capacitive sensing signal onto a sensor electrode in the input device. For example, the capacitive sensing signal may be a modulated signal used to perform absolute capacitive sensing or a transmitter signal used to perform transcapacitive sensing as discussed above. Although a square wave is shown, any waveform suitable for capacitive sensing may be used (e.g., sine wave, trapezoid, triangular, and similar waveforms). In one or more embodiments, the amplitude of transmitter voltages may vary by sensing cycle. Further, in some embodiments, the demodulation waveforms may be modified to optimize the resulting ratio of capacitive sensing signal waveform relative to the received noise from a source driver modulation.

When performing capacitive sensing and display updating simultaneously, the display signals may interfere or insert noise into the capacitive sensing signals and vice versa. For example, the display electrodes (e.g., gate lines, source lines, Vcom electrodes) may be in close proximity to the capacitive sensing electrodes (e.g., sensor electrodes) in the input device such that these electrodes are capacitively coupled. For example, the signals driven on gate lines 1-5 and the outputs of source drivers A and B may insert noise into the capacitive sensing signal (and vice versa). To reduce noise between the active gate lines and active sensor electrodes, in some embodiments, display updating and capacitive sensing may be spatially separated in the display screen. That is, while the input device is updating the pixels in a first portion of the display, the device may simultaneously be performing capacitive sensing in a second portion of the display where the sensor electrodes in the second portion are substantially unaffected by a display signal driven on a display electrode in the first portion. Spatially segmented electrodes may also reduce any display artifacts caused by simultaneous capacitive sensing and display updating.

However, the input device may be unable to entirely avoid the noise caused by the source drivers by using spatial separation, because in many embodiments, all of the source drivers (and source lines) are used simultaneously when updating a row. That is, each of the source drivers may constantly drive modulated voltages onto the source lines which extend throughout the display screen. In contrast, the input device may activate (e.g., increase the voltage) only one or a small number of gate lines at a time when performing a line update while the other gate lines are unused (e.g., remain at a low voltage).

To mitigate noise between the source lines and sensor electrodes, the input device synchronizes the phase and frequency of the capacitive sensing signal to the display signals. Timing chart 500 illustrates the line rate used when performing display updating, which represents the time used by the input device to update a single row in the display (i.e., a line update). In one or more embodiments, at least one sensing cycle may occur per line update. The line rate may be equal to the inverse of the line period. For example, for a line period of 10 microseconds (µs), the line rate may be calculated as 100 kilohertz (kHz). Within the time period defined by the line rate, the input device performs the charge share and the source drivers drive the desired voltages across the pixels. At the end of this time period, a gate line is deactivated and the input device begins to update the pixels on the subsequent row. Now turning to the capacitive sensing signal, the signal includes a plurality of sensing cycles each divided into two half cycles (e.g., a HIGH portion and a LOW portion). As shown here, the rate of the half cycles is approximately twice as fast as the line rate. Stated differently, during each line period, the capacitive sensing signal performs one full sensing cycle. However, in other embodiments, the time period of the half cycles is any multiple of the line period—e.g., the time period of the half cycles can be two times, three times, four times, five times, etc., shorter than the line period. In another embodiment, the line period may be greater than the time period of the half cycles. For example, the line rate may be two, four, eight, or sixteen times faster than the half cycle rate. In some input devices, however, it may be preferred to use half cycle time periods that are shorter than the line update (e.g., a half cycle rate that is faster than the line rate) since this allows the input device to perform greater numbers of sensing cycles and to gather additional samples which may improve capacitive sensing performance. Also, the number of half-cycles per line may be even and/or the number of lines over which a capacitive measurement is filtered is an even number to reduce the filtered effect of source driver modulation noise (e.g., display image) relative to the capacitive sensing signal.

Regardless of whether the line rate is faster or slower than the half cycle rate, the frequency associated with display updating can be synchronized with the frequency of the capacitive sensing signal. As will be discussed further below, if the input device changes the frequency of the capacitive sensing signal, the input device may also update the frequency of display updating (e.g., changing the line rate), so that the phase relationship between the line rate and the time period of the half cycles is maintained.

In addition to synchronizing the frequencies of the display and capacitive sensing signals, these signals are phase aligned. As shown here, the transition from the LOW half cycle to the HIGH half cycle occurs during charge share events when the Source Drivers A and B switch between updating subsequent rows in the display. Thus, when Source Drivers A and B perform charge sharing, a capacitive sensing module (e.g., AFE) coupled to the sensor electrode may be performing a reset of the receiver (i.e., AFE input voltage) which is shown by the demodulated signal. Specifically, the demodulated signal is divided into three different periods: a positive integration period, a reset period, and negative integration period. As shown, the capacitive sensing module performs the positive integration to integrate the charge detected during a portion of the HIGH half cycle and the negative integration to integrate the charge detected during a portion of the LOW half cycle. The reset period is used to reset an analog circuit in the capacitive sensing module between the integration periods. The capacitive sensing module may process and filter a plurality of different samples (e.g., an even number of cycles and/or a number of cycles over an even number of lines) taken during the integration period to detect a change in capacitance (i.e., to perform a measurement of a change in capacitance) that indicates the proximity of an input object to the input device. To prevent or mitigate noise from the source lines from affecting the filtered samples, the reset period of the demodulated signal may always occur during the gate transition and/or the charge share event which are common sources of noise. Advantageously, by aligning the phase of the reset period with the charge share events, the source lines are stationary (i.e., not actively being driven to a different voltage) and the gate lines are not changing.

However, the fact that the capacitive sensing signal is phase aligned with the output of the source drivers such that the charge event falls within the reset period is not the most important consideration. Instead, the fact that the charge share event (or any periodic noise event) consistently falls within the same period of the demodulation signal is what mitigates the effects of the noise event. For example, it is equally permissible to phase align the signals such that the charge event falls within either the positive or negative integration periods. Thus, the input device ensures that any periodic noise event occurring from the display signals (such as a charge share event or gate line transitions) affects the capacitive sensing samples in the same way. If a substantially symmetric and opposite charge share event always occurs within the positive integration period, when the samples are processed and filtered, the charge share events do not indicate any change of capacitance since the filtered measurements are affected equally. In contrast, if the charge share event happens during the reset period in a first sensing cycle but during the negative integration period in a second sensing cycle, the charge caused by the change in voltage coupled to the sensor electrode in the first sensing cycle is lost which may eventually cause the sensing module to erroneously detect a change in capacitance if the problem persists—i.e., the signals remain unsynchronized or are not balanced on a subsequent sensing cycle within a common measurement. Thus, in the case where a change of one polarity is lost in one sensing cycle, a change of the same polarity may be lost in an opposite phase demodulation or a change of opposite polarity lost in the same phase of demodulation of a subsequent line.

In one or more embodiments, an even number of lines are driven per measurement and/or an even number of sensing cycles is driven per measurement. In various embodiments, the above methods may be used to maintain a constant display line rate during a capacitive measurement period using a display buffer (e.g., for a non-display update period).

Moreover, phase aligning the display and capacitive signals as shown in timing chart 500 also mitigates for the noise generated by the transitions of the gate lines on the sensor electrodes used for capacitive sensing. As shown, the gate transitions (e.g., from OFF to ON, or ON to OFF) occur during the reset period when the charge introduced on the sensor electrode by this noise event is ignored, thereby mitigating any effect of the gate line transitions on capacitive sensing. In other embodiments, these noise events can be cancelled out if the transitions happen in the same integration period as discussed above—e.g., the positive and negative transitions always occurs in the positive integration period. In various embodiments, even where the gate transitions take longer than the reset time of the receiver, the difference in total injected charge is reduced and may be substantially constant. Because the periodic transitions affect the positive integration periods in the same manner, when samples are combined and filtered, the charge caused by the noise event on the sensor electrode does not indicate a change in capacitance.

In another embodiment, instead of synchronizing phase and frequency such that the periodic noise event occurs in the same period in each sensing cycle, in one sensing cycle the noise event occurs in the positive integration period but in a subsequent sensing cycle the noise event occurs in the negative integration period. If this substantially symmetric pattern continues, then whatever charge introduced by the noise event in the positive and negative integrations is compensated for when the samples from both integration periods are averaged by a filter to yield a measurement.

In another embodiment, the display and capacitive signals may be synchronized so that the up and down transitions of a noise event occur in the same half cycle. For example, if the time period of the half cycle is two times greater than the time period of the line update, the capacitive sensing signal can be phase aligned such that two consecutive charge share events both occur during one polarity of the integration periods. Furthermore, in another embodiment, display and capacitive sensing signals may be synchronized and phase aligned such that the up transitions of a noise event (e.g., from a low voltage to a higher voltage) may all occur in the positive integration period and the down transitions (e.g., from a high voltage to a lower voltage) all occur in the negative integration period. Like above, once the samples are filtered, the contribution of charge substantially balances and the noise event does not indicate a change of capacitance, and thus, is not interpreted as a proximate input object.

Furthermore, in electrode layouts where the sensor electrodes used in capacitive sensing extend over an even number of source lines, there is an additional cancellation of the noise events generated on the source lines when the polarity of each source line is opposite the polarity of the adjacent source line which occurs during dot, pixel, and line inversions. Even if two adjacent source lines have different voltage amplitudes (i.e., the pixels are set to different colors), because the polarities are opposite, a noise event in one of the adjacent source lines will be in the opposite direction (e.g., from a low voltage to a high voltage or vice versa) than the same noise event in the other source line. Because the capacitive sensing signal is synchronized with the display line rate, the noise event will affect the samples of the capacitive sensing signal in the same manner, and thus, not indicate a change in capacitance.

FIG. 6 illustrates a timing chart 600 for synchronizing capacitive sensing with display updating, according to embodiments described herein. Specifically, timing chart 600 includes signals driven onto gate lines 1-4, a "fast" received sensing signal, a "slow" received sensing signal, and demodulated signals based on the capacitive sensing signals.

Generally, the same principles and techniques described above with respect to timing chart 500 may also apply to FIG. 6. For example, the gate lines 1-4 may be arranged sequentially in a display screen and may correspond to display pixel rows. As shown, the gate lines 1-4 are pipelined gate lines. Though not depicted here, source drivers may drive signals to update pixels concurrent with capacitive sensing and/or during periods when capacitive sensing does not occur, consistent with the descriptions provided above.

In one embodiment, an input device uses a capacitive sensing signal having a first frequency to perform capacitive sensing. Of course, the capacitive sensing signal may be selected to perform absolute capacitive or transcapacitive sensing, and may be a square wave or other suitable waveform. As shown, the demodulated signals may include periods for positive integration, negative integration, and reset.

Various sources of interference may introduce charge into a received capacitive sensing signal, and affect capacitive sensing performance. In several embodiments, the input device is configured to detect the presence of interference, and to adjust the capacitive sensing signal to reduce the effects of the interference. Detecting the presence of interference may be performed directly (e.g., sensing at various frequencies) or indirectly (e.g., measuring performance of the capacitive sensing system using a SNR value or bit error rate). As will be discussed in greater detail below in FIG. 7, the frequency of the capacitive sensing signal may be selectively adjusted to reduce the effects of the noise on the capacitive sensing signal. This may include avoiding frequencies at which substantial interference appears.

One possible solution to change the frequency of the capacitive sensing signal from the first frequency may be to simply scale the timing of the signal and its corresponding demodulated signal. Scaling the signal would generally affect all portions or components of the signals similarly (i.e., by increasing or decreasing each of the portions by the same percentage). However, such an approach may overlook timing considerations that the input device may require for the capacitive sensing signal and/or the demodulated signal, in order to perform capacitive sensing.

In any event, several embodiments may allow portions of the capacitive sensing signal and/or demodulated signal to be adjusted independently while changing the frequency of the capacitive sensing signal. For example, the periods of integrating charge in the demodulated signal may be changed while non-measuring periods remain fixed, or vice versa, or the different periods may be changed differently (i.e., not by the same amount or percentage). In one or more embodiments, one or more features of non-measuring periods may be changed concurrent with changing the frequency of demodulation. In order to maintain the frequency and/or phase synchronization between the capacitive sensing and display updating systems, the frequency of display updating may also be adjusted in response to changes in the capacitive sensing signal. For example, the line rate/period for display updating or gate line activation times may be changed concurrent with the updated capacitive sensing signal frequency In timing chart 600, the demodulated signal (fast) corresponds to a capacitive sensing signal having a first frequency, and the demodulated signal (slow) corresponds to a capacitive sensing signal having a second, adjusted frequency. For this example, assume that the demodulated signal (fast) includes reset periods of 1.5 microseconds (μs) each, and positive and negative integration periods of 3 μs each. Accordingly, the sensing cycle (fast) (here, corresponding to one line period) may include two reset periods and two integration periods, totaling 9 μs. Accordingly, the first frequency of the capacitive sensing signal (and line rate) is therefore approximately 111.1 kHz. While the various times in this example have been chosen for ease of understanding, other times (and frequencies) may be selected and produce comparable results. For example, the first frequency could be relatively slower than the second frequency.

Assume further that an interference source is producing interference near the first frequency, or near other susceptible frequencies such as harmonics of the first frequency, that degrades performance of the capacitive sensing system. The input device may determine whether to shift the capacitive sensing signal frequency away from the first frequency to avoid the interference, for example, by measuring the interference signal and comparing the interference with a threshold value. In one or more embodiments, the interference value may be measured while capacitive sensing is not performed (e.g., transcapacitive sensing and/or absolute capacitive sensing), or the interference measurement may be out of phase with the signal measurements over some filter length.

The input device may change the frequency of the capacitive sensing signal to avoid the effects of the interference. In this example, and corresponding to the demodulated signal (slow), the input device decreases the frequency of the capacitive sensing signal in order to avoid the interference.

Of course, the input device may additionally or alternately increase the frequency of the capacitive sensing signal to avoid the interference source. Assume further that the demodulated signal (slow) includes longer reset periods of 2 μs each, while keeping the positive and negative integration periods at 3 μs each. Accordingly, the sensing cycle (slow) and a corresponding line period increase to 10 μs. As such, the second frequency (and line rate) is approximately 100 kHz.

In the example, portions of the demodulated signal are adjusted (i.e., the reset periods are lengthened), and other portions of the demodulated signal remain the same (i.e., the integration periods), in adjusting the frequency of the capacitive sensing signal. Such an approach may reflect timing requirements used by the input device to generate the capacitive sensing signal and/or the demodulated signal. These timing requirements could reflect a minimum requirement for capacitive sensing (e.g., any less time would not produce a distinguishable signal when received and demodulated), or could be a parameter for optimizing capacitive sensing performance (e.g., the minimum time is selected to balance between a desired level of sensing performance and the input device's ability to perform other tasks). For instance, the input device may require a minimum amount of time during each sensing cycle (or half-cycle) for driving the capacitive sensing signal onto sensor electrodes to allow the received signal adequate time to settle. In the example discussed above, the 3 μs selected for positive and negative integration periods could reflect the minimum settling time. Such a minimum settling time could be selected to ensure that the received signal has reached at least a desired fraction or percentage of the settled voltage. For example, a minimum settling time may represent the time for the received capacitive sensing signal to reach 99% of its ultimate settled value. In some cases, the desired fraction or percentage may be determined using properties of the sensor electrodes (e.g., an RC time constant), and independent of the properties of the capacitive sensing signal (e.g., amplitude). In some embodiments, the desired fraction or percentage may be selected to ensure a phase error is in a desired range.

When the input device changes the frequency of the capacitive sensing signal, the input device may also update the frequency of display updating (e.g., changing the line rate) to maintain synchronization between the signals and to take advantage of the interference-cancelling benefits described in FIG. 5. In other words, the relationship between the display line rate and the time period of the sensing cycles (or half cycles) may be maintained.

In timing chart 600, the gate line transitions (i.e., the rising and falling edges of the signal) on gate lines 1-4 occur at various times A1, B1, C1, D1 for the first capacitive sensing signal (and having the relatively faster frequency). As shown, and in accordance with the discussion above, the gate line transitions may occur during reset periods of the demodulated signal, so that charge introduced onto the sensor electrode by the gate line transition is ignored. Therefore, the effect of the gate line transitions on capacitive sensing may be mitigated. Of course, gate line transitions may occur at other times outside of the reset periods, and the predictable or consistent occurrence of the gate line transitions may allow the input device to better mitigate their effects on capacitive sensing performance.

In order to maintain synchronization when the frequency of the capacitive sensing signal is changed, the frequency of display updating (corresponding to the line rate) may be changed similarly. In the example, the time period of the sensing cycles increased from 9 μs to 10 μs, an increase of 11%. Accordingly, the line update period (corresponding to the line rate) should also increase proportionally to maintain the synchronization. In this example, the line update period increases to the same 10 μs. The times at which gate line transitions occur may be adjusted for changes to a line update period; in this example, the transitions may be delayed for the longer line update period. In one embodiment, turn-on times for the gate lines may be delayed. In another embodiment, a turn-off time for a gate line may also be delayed in the same or a different amount as the turn-on time delay for that gate line. In timing chart 600, the various gate line transitions for gate lines 1-4 are shown at times A2, B2, C2, D2 for the second capacitive sensing signal having the relatively lower frequency. Showing several iterations of driving gate lines, timing chart 600 illustrates that the amount of delay for successive gate line transitions will continue to increase over time, which is consistent with setting a new, longer line update period. For example, the delay between A1-A2 is less than the delay between B1-B2, which is less than C1-C2, and so forth.

In some embodiments, the frequency of the capacitive sensing signal may differ from the line rate used for display updating, while still permitting synchronization between the two signals. As described above, the time period of sensing half cycles may be any multiple of the time period for the line rate (for example, 2×, 3×, 4×, 8×, ½, ¼th, ⅛th, etc.). If the signals are phase aligned, the reset periods of the demodulated signal will at least partially overlap with charge share periods, providing some interference mitigation. Depending on the multiple that is selected, however, the reset periods may not overlap with all gate line transitions (or at least a portion of), which may add interference to the capacitive sensing system. However, if the gate line transitions occur consistently during a portion of the capacitive sensing signal (e.g., the negative integration period), and a sufficient number of samples are taken during the corresponding portions over several sensing cycles, then processed and filtered as discussed above, the charge introduced by the gate line transitions may be predictable, so that the charge will not be mistaken for a user input-related change in capacitance.

To maintain synchronization between display updating and capacitive sensing, the timing of the source drivers may be adjusted accordingly. To adjust the timing of the display update period, the input device may adjust one or more of the portions of the display update period. Adjustable portions of the display update period may include the length of a charge share period (shown in chart 500), as well as the time that source drivers drive the desired voltages across the pixels. For example, the input device may lengthen charge share periods when the capacitive sensing signal is changed from a first, faster frequency to a second, slower frequency, such as in chart 600.

Figure 7:
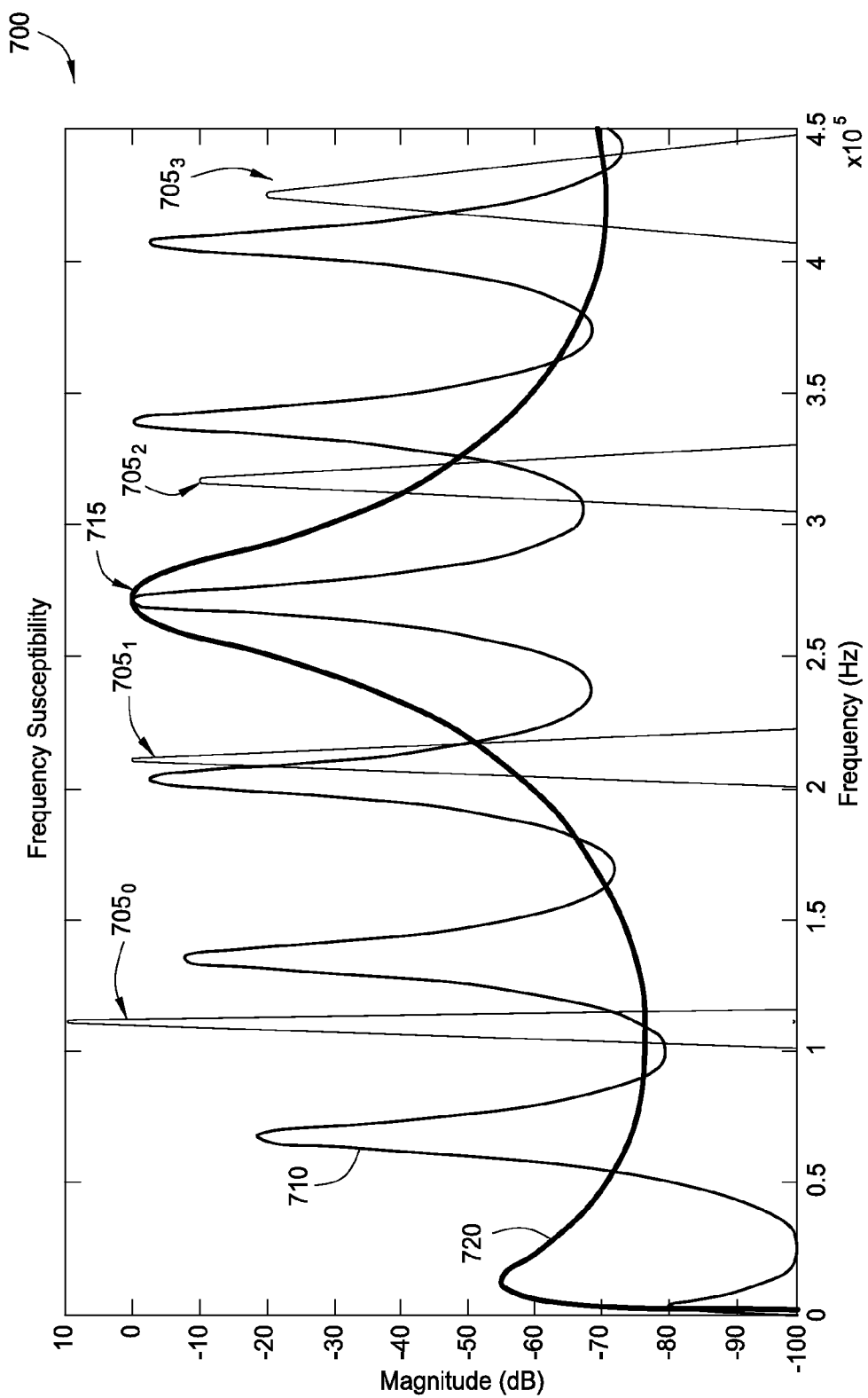
FIG. 7 is a graph 700 illustrating noise susceptibility for capacitive sensing, according to one embodiment disclosed herein.

FIG. 7 is a graph 700 illustrating interference susceptibility for capacitive sensing, according to one embodiment disclosed herein. Beyond the noise that may be introduced by driving display signals, discussed above, other sources of interference may also interfere with the capacitive sensing signal and degrade sensing performance.

Some example interference sources include one or more of battery charger noise, LED backlights, external fluorescent lamps, variable voltage power supplies, actively modulated input devices (e.g., an active pen), boost converters, and inputs modulated relative to touch sensors.

Interference may occur throughout the frequency spectrum, and may include peaks at several discrete locations throughout the frequency spectrum. This may include a fundamental frequency of the interference, in addition to harmonics (i.e., integer multiples of the fundamental frequency). To avoid the effect of the interfering frequencies introduced by the interference source(s), the input device may select (or change) the frequency of the capacitive sensing signal in order to reduce or eliminate any significant overlap between the interfering frequencies and the filtered sensing bandwidth.

In graph 700, the susceptibility of a first capacitive sensing signal to interference is represented by plot 710. The first capacitive sensing signal operates at a frequency of approximately 67.5 kHz, and the related plot 710 shows that the first capacitive sensing signal is relatively susceptible to interference from interference near that frequency (i.e., a local peak in the susceptibility). Plot 710 also shows that the first capacitive sensing signal is susceptible to interference at harmonics of the operating frequency, as local peaks occur at approximately 135 kHz (2×67.5 kHz), 202.5 kHz (3×), 270 kHz (4×), and so forth.

Also depicted in graph 700 is a frequency response of an example interference source, which may be any of those sources discussed above. The interference source introduces interference at a fundamental frequency of approximately 110 kHz (represented by local peak $705_0$) and harmonics introduce additional interference at approximately 220 kHz (local peak $705_1$), 330 kHz (local peak $705_2$), and so forth. In order to avoid the interference introduced by the interference source, the input device may select a frequency for the capacitive sensing signal that does not overlap with the local peaks in the frequency response of the interference source (e.g., plot 720 at about 270 kHz)

During operation, the input device may shift the frequency of the capacitive sensing signal based on measured interference at a first frequency and/or a second frequency. For example, the input device may compare the detected interference to one or more thresholds and switch from the first frequency to the second frequency (or back to the first frequency from the second frequency) when the interference meets or exceeds one of the thresholds. In one embodiment, receiver electrodes may be configured to receive resulting interference signals during at least a portion of a non-display period (such as an in-frame blanking period). During non-display periods, the interference caused by driving display signals onto display electrodes may be minimized, so that the interference caused by the interference source may be isolated.

The input device may shift the capacitive sensing signal from a frequency to a multiple of the first frequency (for example, 2×, 3×, 4×, 8×, ½, ¼th, ⅛th, etc.). In graph 700, plot 720 illustrates the susceptibility of a second capacitive sensing signal, whose frequency (about 270 kHz) is approximately 4× that of the first capacitive sensing signal. Plot 720 includes fewer susceptibility peaks than plot 710 over the frequency range depicted in graph 700 (i.e., in approximately a 4:1 ratio). This suggests that capacitive sensing may generally be less susceptible when the sensing signals are operated at higher frequencies, including substantially an immunity to lower frequency interferences, as well as fewer susceptibility peaks throughout the frequency spectrum.

While using multiples of the capacitive sensing signal frequency in some cases may reduce susceptibility to interference, this may not always be the case. For example, if the first capacitive sensing signal frequency is the approximately 270 kHz indicated by plot 720, reducing the frequency to a lesser multiple (like plot 710) actually increases susceptibility. Further, increasing capacitive sensing signal frequency using multiples would not eliminate all susceptibility to harmonics, but merely some fraction of the harmonics. Thus, a interference source that affects the capacitive sensing signal at a particular frequency may continue to affect the shifted capacitive sensing signal (at the multiplier frequency).

In this regard, the techniques described in FIG. 6 for shifting the frequency of a capacitive sensing signal may be particularly advantageous. By adjusting the timing of component(s) of the capacitive sensing signal, the length of sensing cycles may be increased or decreased, effectively shifting the frequency of the capacitive sensing signal from a first frequency to a second frequency having a lower susceptibility to interference. Such a frequency shift may effectively eliminate the susceptibility of the capacitive sensing signal to a particular interference source, as the harmonics of the interference source may be entirely avoided. And as discussed above, frequency shifting by adjusting components of the capacitive sensing signal also ensures that timing considerations or requirements for capacitive sensing may still be met.

Figure 8:
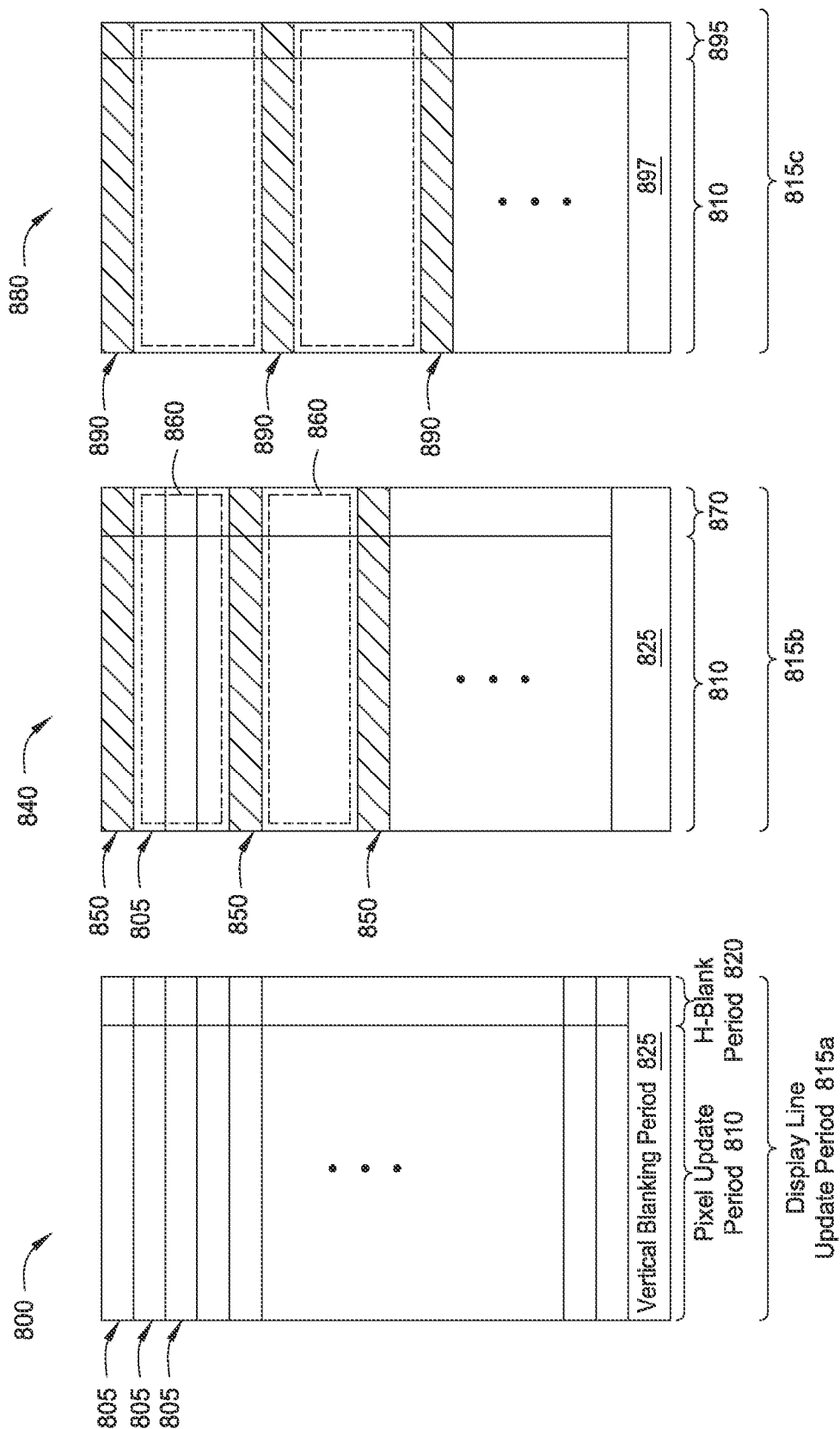
FIG. 8 illustrates timing charts for display frames, according to one embodiment.

FIG. 8 illustrates timing charts for display frames, according to one embodiment. The timing charts illustrate the different time periods used for a display frame 800, 840, 880. Generally, the area of the timing charts represents the amount of time required to update a display. While intervals and timing included in each of the display frames 800, 840, 880 may vary, the areas of the display frames are assumed to be the same. For example, maintaining a 60 Hz frame rate results in a frame time of 16.67 milliseconds (ms). The timing charts 800, 840, 880 generally illustrate changes that may be made to the timing of a display signal to maintain synchronization with capacitive sensing signal while maintaining a desired frame rate.

The display line update periods 815(*a-c*) represents the amount of time used to update a single display line 805 of a display screen in the input device, such as input device 100. The display line update period 815 is further divided into a pixel update period 810, and a buffering period called a horizontal blanking period 820, or "h-blank." During this and other buffering periods, the display driver generally does not update display pixels. Instead, the display driver may use the buffering periods to retrieve data for updating a next display line, to allow signal settling, to receive interference signals (described above), change gate selection and so forth. In various embodiments, the pixel update period 810 may be held substantially constant to reduce display artifacts while the line update period may be changed.

In some embodiments, display frames 800, 840, 880 may include various additional buffering periods. For example, display frames 800, 840, 880 include a vertical blanking period 825 (or "v-blank") that generally occurs between the last display line update period of one frame and the first display line update period of a next frame. Display frames 840, 880 also include in-frame blanking period 850 (or "long horizontal blanking," "long h-blank," "distributed blanking," etc.).

While the timing charts of FIG. 8 generally show display updating information, capacitive sensing may occur contemporaneously with the display updating. The in-frame blanking periods 850 may be separated by periods of combined capacitive sensing or interference sensing and display updating 860, during which a number of display lines 805 are updated. As discussed above, the capacitive sensing and display updating signals may be synchronized to improve capacitive sensing performance. Of course, capacitive sensing may also occur during the various buffering periods, even though no display updating is occurring.

The length and timing of the buffering periods may be selected based on performance and/or computing requirements. As discussed above, the display update periods and rates may be modified along with capacitive sensing rates to avoid sources of interference. However, display data may still be provided to the input device at a constant rate (while the display line update rate may change), or at least at a rate that is different than the display update rate. In order to preserve all the display data for accurate display, the buffer must be appropriately sized to support a maximum difference between the rate the data is provided to the input device and the rate that the data is displayed (or the host pixel rate and the display pixel rate, respectively). Using the earlier example, in which the display update period increased by 11% when the frequency of the capacitive sensing signal was changed, the size of the buffer would be at least 11% of the data of a full display frame.

In one embodiment, the time for v-blank period 825 may be appropriately sized so that display data may be retrieved from the buffer once per display frame. In various embodiments, this allows changing line rate 815a However, a relatively large amount of memory would be needed for the buffer.

In another embodiment, in-frame blanking periods 850 may be used to retrieve data from the buffer. In this case, the buffer size may be significantly smaller. For example, say 16 in-frame blanking periods are included per display frame. If buffer data is retrieved during each in-frame blanking period, the buffer size may be selected to be as small as $\frac{1}{16}$th of the maximum pixel rate difference (e.g., less than one percent; however, other percentages may also be used). Of course, other numbers of blanking periods and the times when buffer data is retrieved may be selected. In another example, data may be retrieved from the buffer a number of times per display frame that is less than the number of in-frame blanking periods.

By adding in-frame blanking periods or changing their size, other adjustments may need to be made to maintain the set amount of display frame update time (i.e., represented by the fixed area of display frames 800, 840, 880). In display frame 880, a larger in-frame blanking period 890 is selected than the in-frame blanking period 850 of display frame 840. To maintain the total amount of display update time, the size of other buffering periods may be appropriately adjusted (e.g., to allow 815b to change to 815c). As shown, h-blank period 895 and v-blank period 897 are smaller than their counterparts in display frame 840 to compensate for the larger in-frame blanking periods 890. Of course, the various buffering periods may be adjusted differently; one buffering period could be decreased while another period remains the same or is even increased.

In some embodiments, the location of the in-frame blanking periods may be dithered between different display frames. When in-frame blanking periods occur at fixed times in the display update period, the display updates correspondingly pause at the same spatial locations on the display screen (say, the same display line) over multiple frames. Any problems that occur with displaying pixels near the paused locations may be propagated over several frames (e.g., visual display artifacts). By dithering the blanking periods, even where display errors occur in one frame, the errors may be less perceptible to a viewer, or may be corrected more quickly when display data for a subsequent frame is driven.

Figure 9:
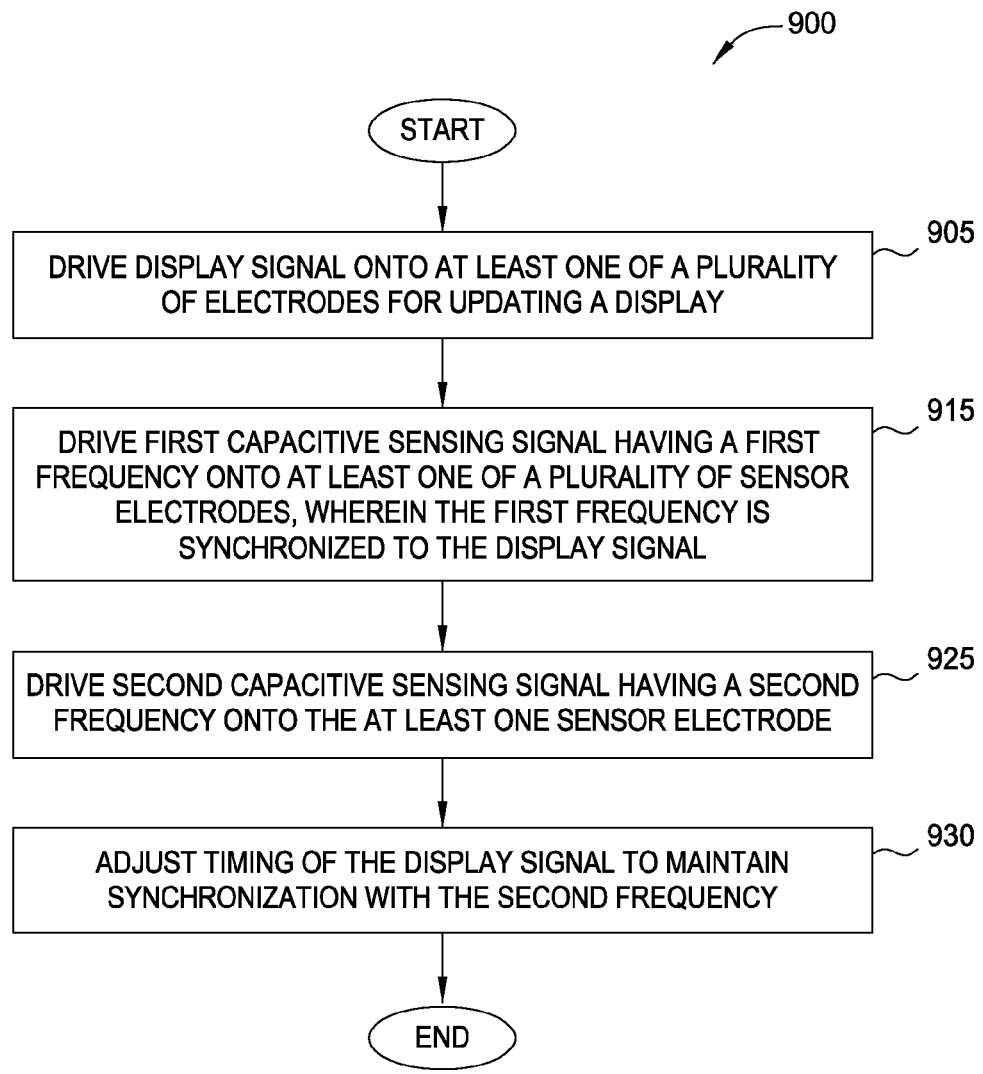
FIG. 9 is a method for frequency shifting for synchronized display update and capacitive sensing, according to one embodiment.

FIG. 9 is a method for frequency shifting for synchronized display update and capacitive sensing, according to one embodiment. Method 900 is generally intended to be performed using the input devices and processing systems disclosed above. The above description of the function of the input devices and processing systems is intended to complement the relatively brief description of the method that follows.

Method 900 begins at block 905, where a display signal for updating a display is driven onto at least one of a plurality of display electrodes.

At block 915, a first capacitive sensing signal is driven onto at least one of a plurality of sensor electrodes. The first capacitive sensing signal has a first frequency that is synchronized to the display signal. The first capacitive sensing signal and the display signal are driven in parallel for at least some period of time.

At block 925, a second capacitive sensing signal is driven onto the at least one sensor electrode. The second capacitive sensing signal has a second frequency that differs from the first frequency, which may be selected to avoid sources of interference and thereby improve capacitive sensing performance. The second frequency may be greater than or less than the first frequency. The second capacitive sensing signal and the display signal are also driven in parallel for at least some period of time.

At block 935, the timing of the display signal is adjusted to maintain synchronization with the second frequency. Adjusting the timing may include adjusting transition times for gate lines for the display, as well as adjusting one or more of the portions of the display update period, such as charge share periods. Method 900 ends following completion of block 935.

CONCLUSION

Various embodiments of the present technology provide input devices and methods for improving usability.

The input device may synchronize the phase and frequency of the capacitive sensing signal to the display signals in order to mitigate interference between the source lines and sensor electrodes, and thereby improve capacitive sensing performance. To avoid sources of interference, the input device may adjust the frequency of the capacitive sensing signal, and may correspondingly adjust the display signal to maintain the synchronization and thereby maintain the performance benefits.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

I claim:

1. An input device comprising:
a plurality of display electrodes;
a plurality of sensor electrodes; and
a processing system coupled with the plurality of display electrodes and with the plurality of sensor electrodes, wherein the processing system is configured to:
drive a display signal onto at least one of the plurality of display electrodes for updating pixels of a display, drive, during a first period that at least partially overlaps with driving the display signal for updating pixels of the display, a first capacitive sensing signal having a first frequency onto at least one sensor electrode of the plurality of sensor electrodes, wherein the first frequency is synchronized with the display signal, and drive, during a second period that at least partially overlaps with driving the display signal for updating pixels of the display, a second capacitive sensing signal having a second frequency onto the at least one sensor electrode, wherein the first and second frequencies differ; and adjusting a timing of the display signal to maintain synchronization of the display signal with the second frequency.

2. The input device of claim 1, wherein the timing of the display signal is further adjusted to maintain synchronization with a phase of the second capacitive sensing signal, wherein the phase of the second capacitive sensing signal is different from a phase of the first capacitive sensing signal.

3. The input device of claim 1, wherein each of the first and second capacitive sensing signals defines a respective one or more sensing cycles, each sensing cycle comprising two half cycles, wherein a duration of each half cycle of the two half cycles is synchronized with the display signal.

4. The input device of claim 1, wherein adjusting a timing of the display signal includes adjusting a line rate for a gate line used to activate a row of display pixels of the display.

5. The input device of claim 4, wherein the difference between the first and second frequencies results from varying an amount of time between display updates of sub-pixels in the activated row.

6. The input device of claim 4, wherein adjusting a timing of the display signal includes delaying a turn-on time for the gate line.

7. The input device of claim 1, wherein the processing system further comprises a display line buffer having a size based on a length of a capacitive sensing period associated with driving the first and second capacitive sensing signals, the size of the buffer further based on a difference in a host pixel update rate and a display pixel update rate.

8. The input device of claim 1, wherein at least one of the plurality of sensor electrodes comprises at least one of the plurality of display electrodes.

9. A processing system, comprising:
a display module configured to drive a display signal onto at least one of a plurality of display electrodes for updating pixels of a display; and
a sensing module configured to:
drive, during a first period that at least partially overlaps with driving the display signal for updating pixels of the display, a first capacitive sensing signal having a first frequency onto at least one sensor electrode of the plurality of sensor electrodes, wherein the first frequency is synchronized with the display signal, and
drive, during a second period that at least partially overlaps with driving the display signal for updating pixels of the display, a second capacitive sensing signal having a second frequency onto the at least one sensor electrode, wherein the first and second frequencies differ,
wherein the display module is further configured to adjust a timing of the display signal to maintain synchronization of the display signal with the second frequency.

10. The processing system of claim 9, wherein each of the first and second capacitive sensing signals defines a respective one or more sensing cycles, each sensing cycle comprising two half cycles, wherein a duration of each cycle of the two half cycles is synchronized with the display signal.

11. The processing system of claim 9, wherein adjusting a timing of the display signal includes adjusting a line rate for a gate line used to activate a row of pixels of the display.

12. The processing system of claim 11, wherein the difference between the first and second frequencies results from varying an amount of time between display updates of sub-pixels in the activated row.

13. The processing system of claim 11, wherein adjusting a timing of the display signal includes delaying a turn-on time for the gate line.

14. The processing system of claim 9, wherein the processing system further comprises a display line buffer having a size based on a length of a capacitive sensing period associated with driving the first and second capacitive sensing signals, the size of the buffer further based on a difference in a host pixel update rate and a display pixel update rate.

15. The processing system of claim 9, wherein at least one of the plurality of sensor electrodes comprises at least one of the plurality of display electrodes.

16. A method, comprising:
driving a display signal onto at least one of a plurality of display electrodes for updating pixels of a display,
driving, during a first period that at least partially overlaps with driving the display signal for updating pixels of the display, a first capacitive sensing signal having a first frequency onto at least one sensor electrode of a plurality of sensor electrodes, wherein the first frequency is synchronized with the display signal, and
driving, during a second period that at least partially overlaps with driving the display signal for updating pixels of the display, a second capacitive sensing signal having a second frequency onto the at least one sensor electrode, wherein the first and second frequencies differ; and
adjusting a timing of the display signal to maintain synchronization of the display signal with the second frequency.

17. The method of claim 16, wherein each of the first and second capacitive sensing signals defines a respective one or more sensing cycles, each sensing cycle comprising two half cycles, wherein a duration of each half cycle of the two half cycles is synchronized with the display signal.

18. The method of claim 16, wherein adjusting a timing of the display signal includes adjusting a line rate for a gate line used to activate a row of pixels of the display.

19. The method of claim 18, wherein the difference between the first and second frequencies results from varying an amount of time between display updates of sub-pixels in the activated row.

20. The method of claim 18, wherein adjusting a timing of the display signal includes delaying a turn-on time for the gate line.

21. The method of claim 16, wherein adjusting the timing of the display signal is performed using a display line buffer having a size based on a length of a capacitive sensing period associated with driving the first and second capacitive sensing signals, the size of the buffer further based on a difference in a host pixel update rate and a display pixel update rate.

22. The method of claim 16, wherein at least one of the plurality of sensor electrodes comprises at least one of the plurality of display electrodes.

\* \* \* \* \*

UNITED STATES PATENT AND TRADEMARK OFFICE
CERTIFICATE OF CORRECTION

PATENT NO. : 9,442,615 B2  
APPLICATION NO. : 14/503068  
DATED : September 13, 2016  
INVENTOR(S) : Joseph Kurth Reynolds Page 1 of 1

It is certified that error appears in the above-identified patent and that said Letters Patent is hereby corrected as shown below:

In the Claims

Column 31, Claim 4, Line 30, before "pixels" delete "display";

Column 32, Claim 16, Line 29, delete "display," and insert -- display; --, therefor.

Signed and Sealed this  
Thirteenth Day of March, 2018

Andrei Iancu  
*Director of the United States Patent and Trademark Office*